Figure 1:
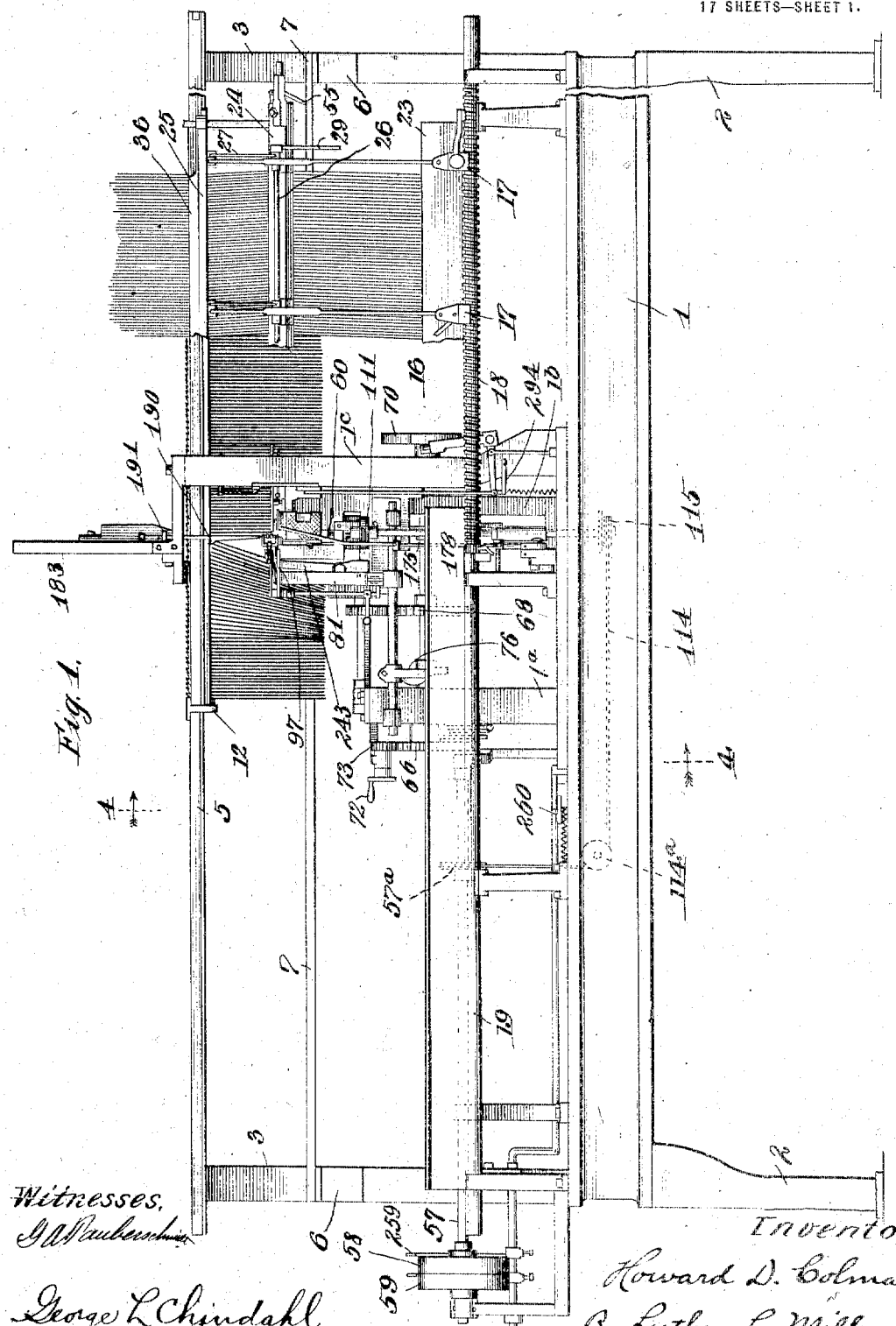

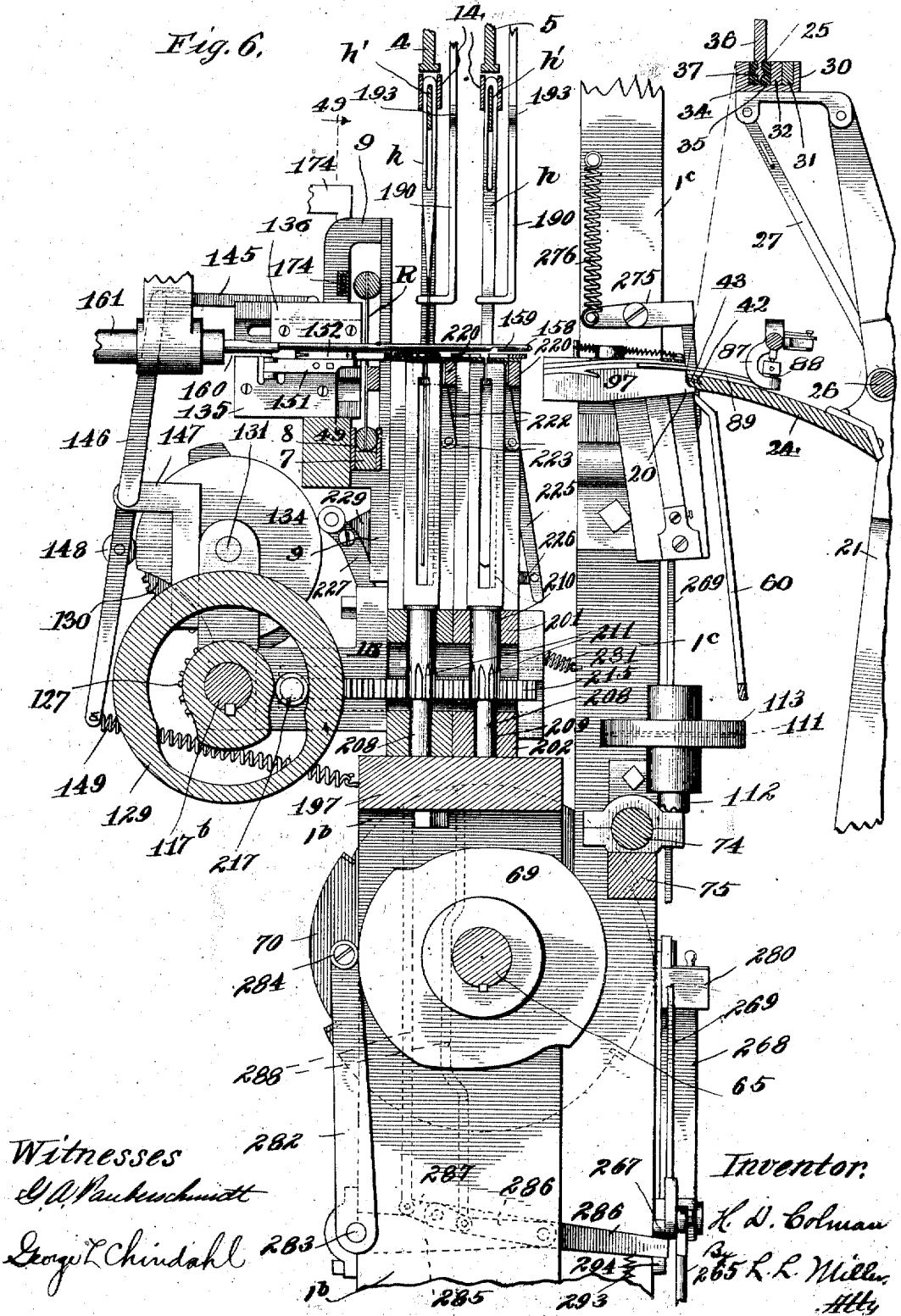

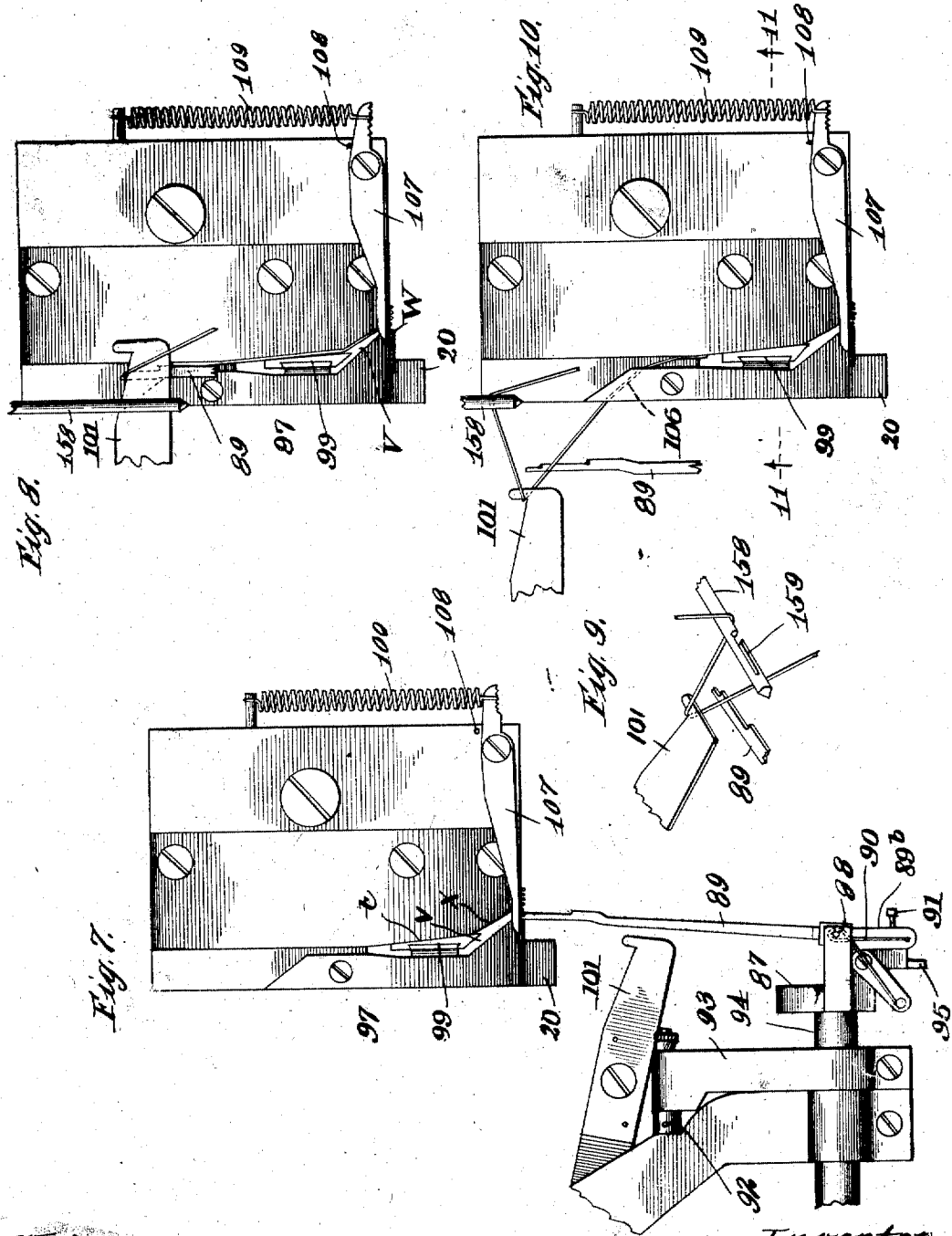

H. D. COLMAN.
MACHINE FOR PREPARING WARPS FOR WEAVING.
APPLICATION FILED OCT. 12, 1904.
1,211,677.
Patented Jan. 9, 1917.
17 SHEETS—SHEET 8.
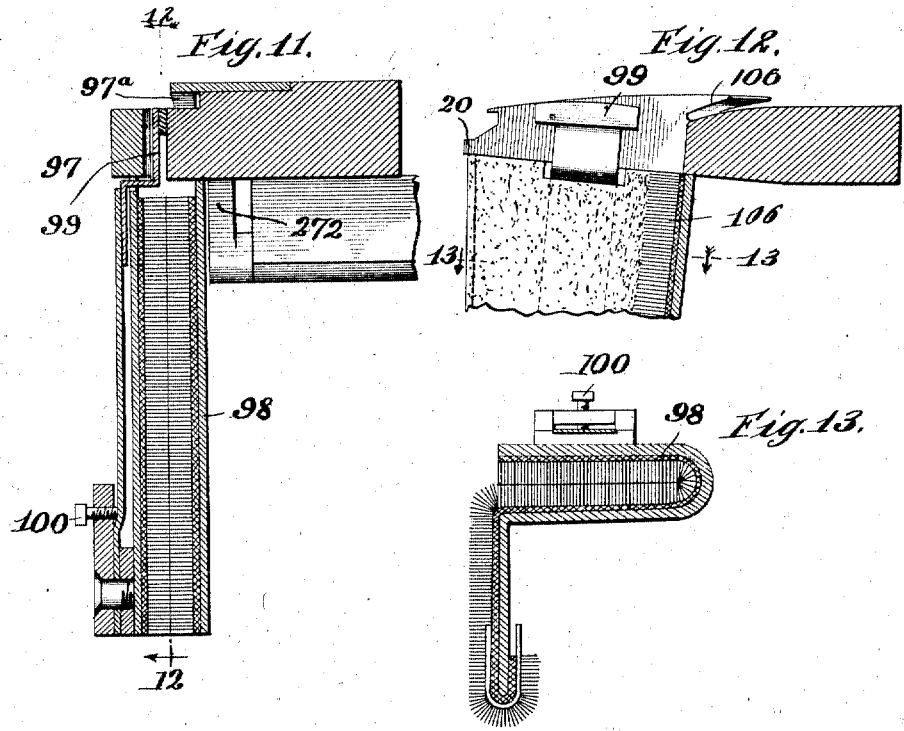
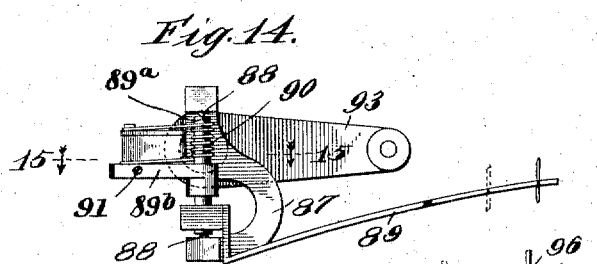
Witnesses
J. A. Taubenschmidt
George L. Chindahl
Inventor
Howard D. Colman
By Luther L. Miller
Atty H. D. COLMAN.
MACHINE FOR PREPARING WARPS FOR WEAVING.
APPLICATION FILED OCT. 12, 1904.
1,211,677.
Patented Jan. 9, 1917.
17 SHEETS—SHEET 9.
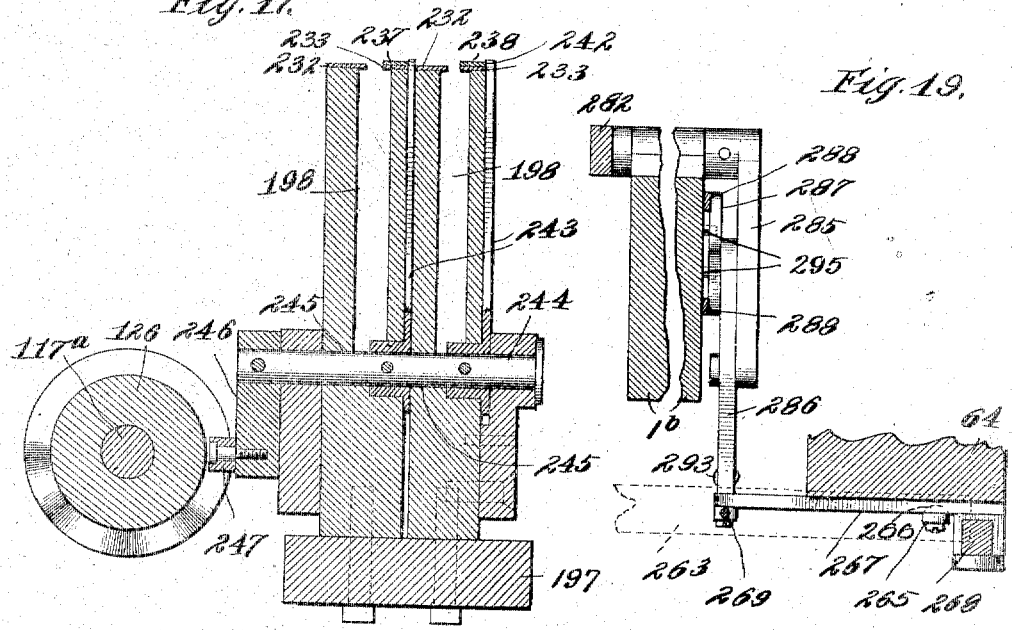
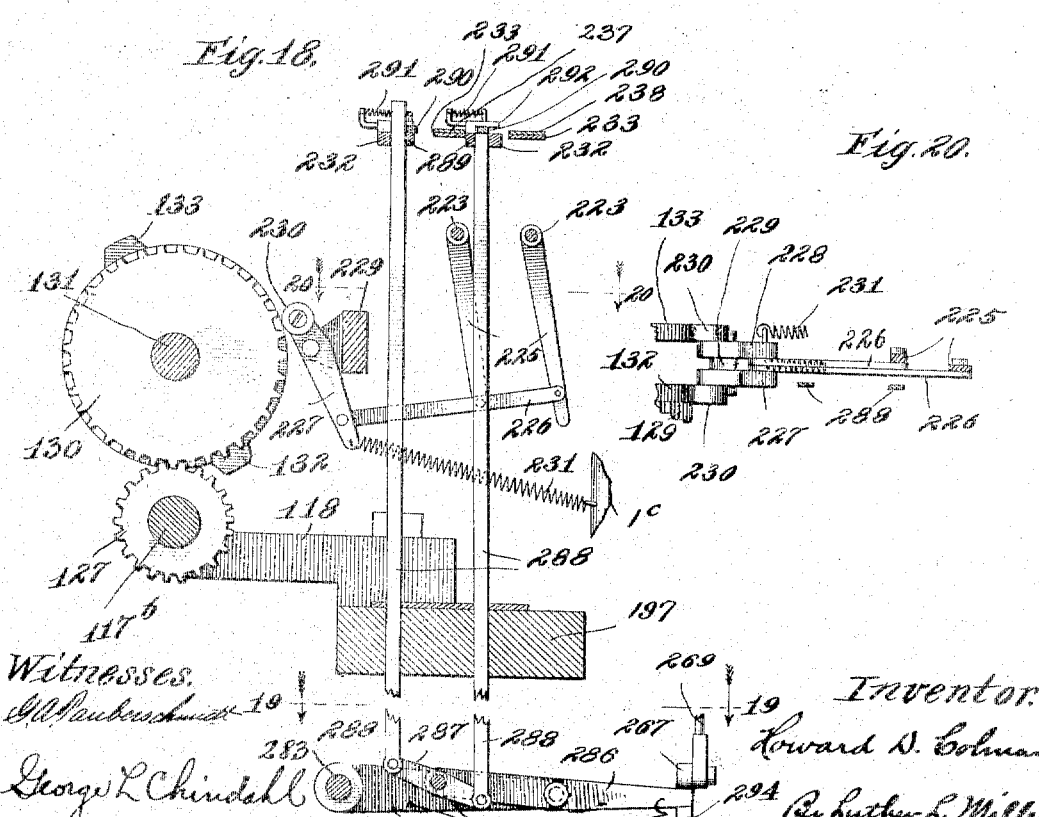

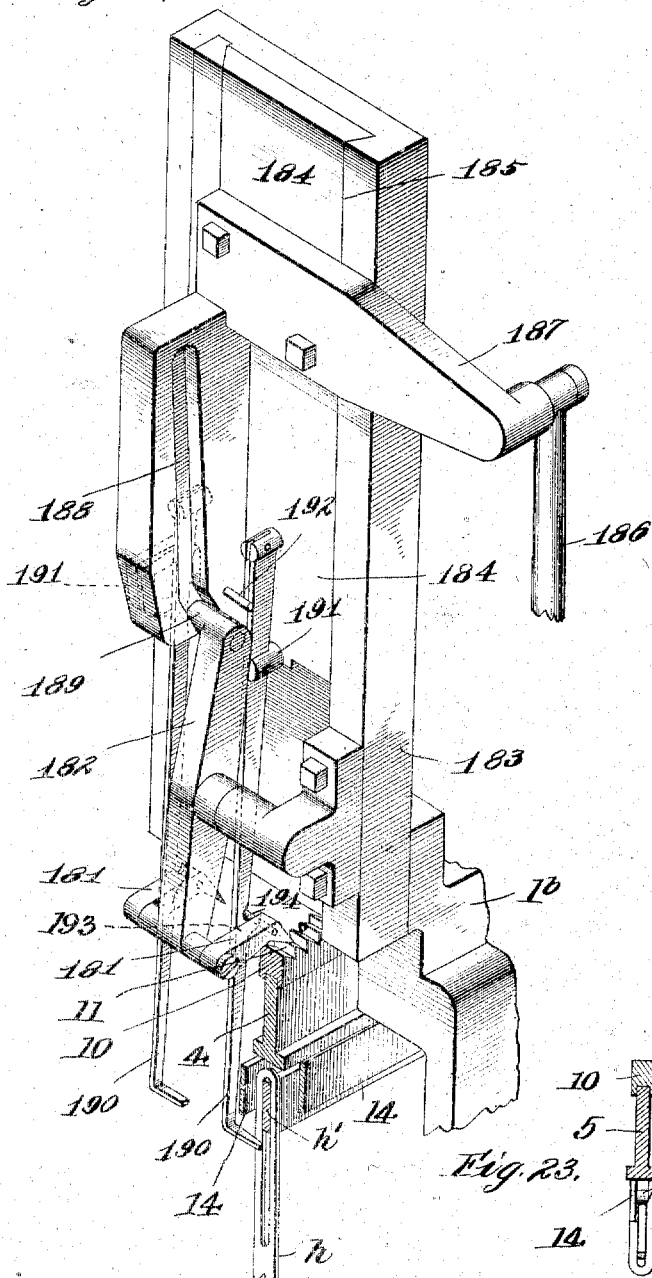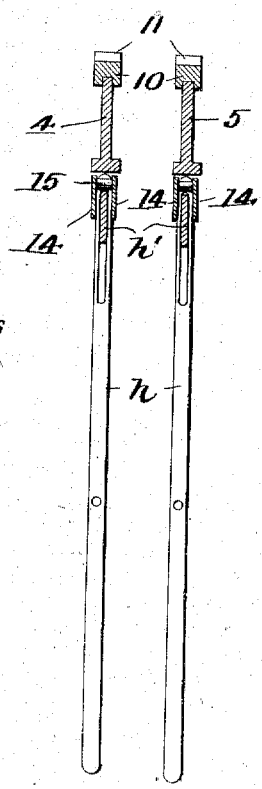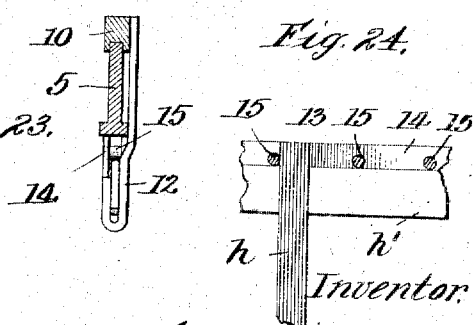

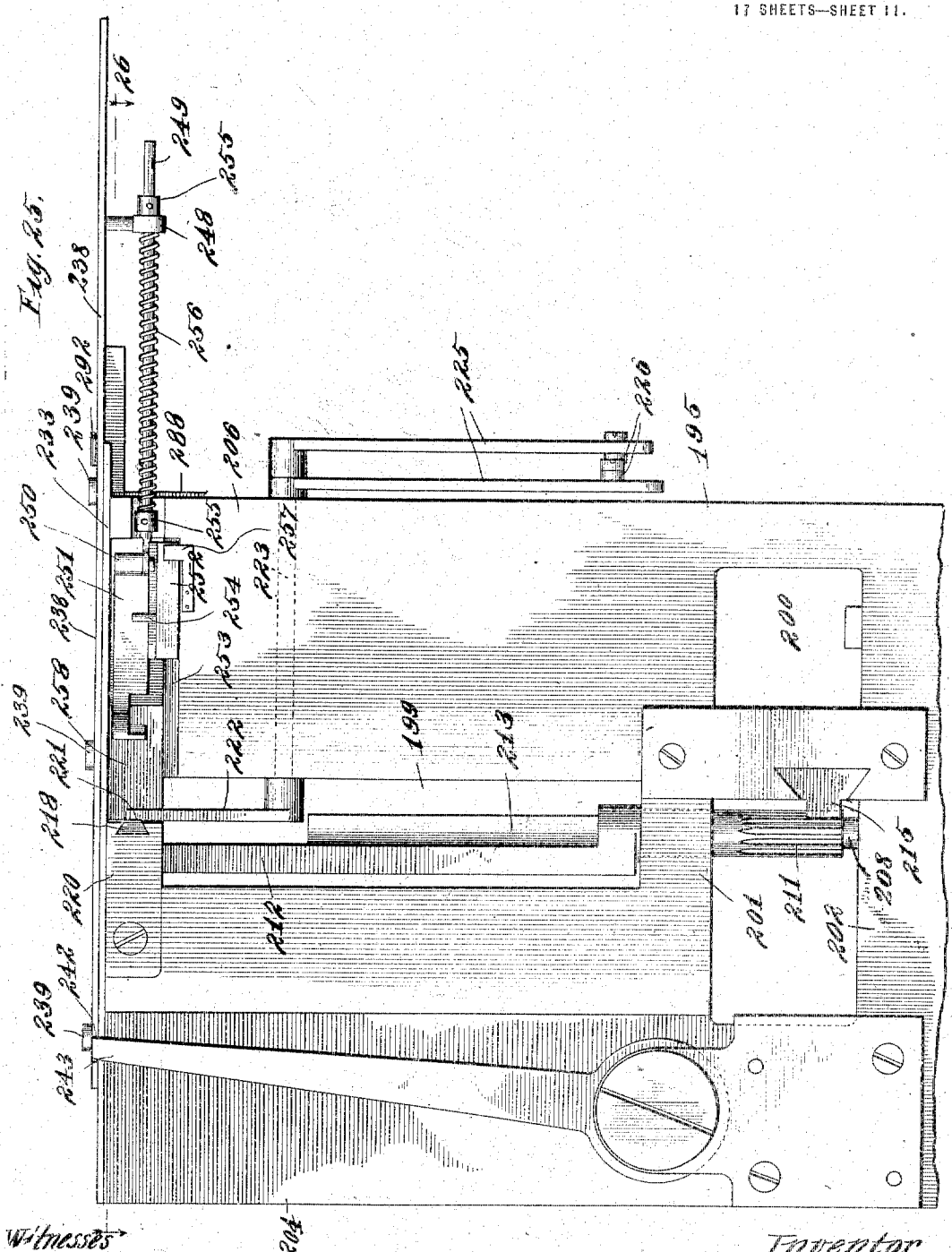

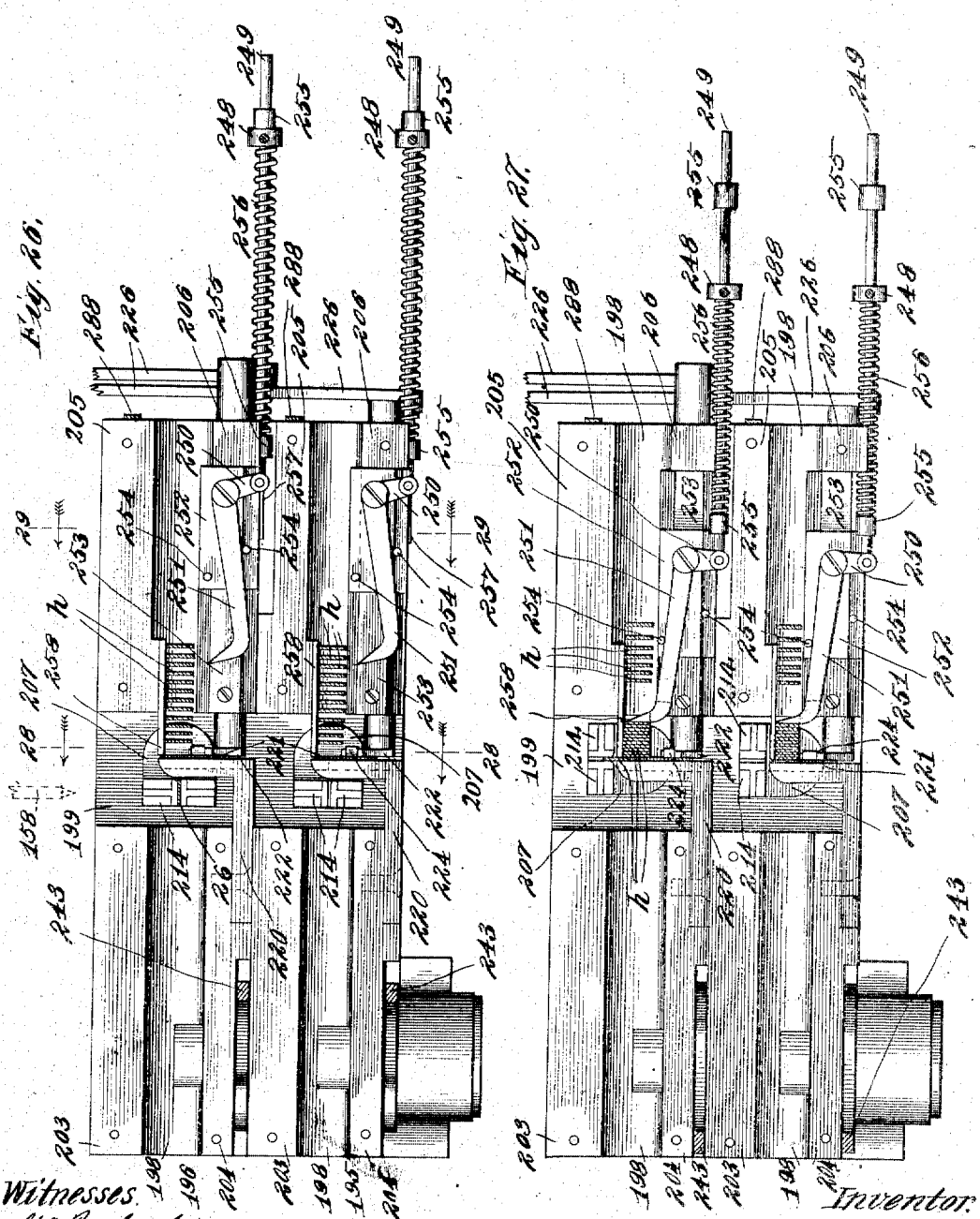

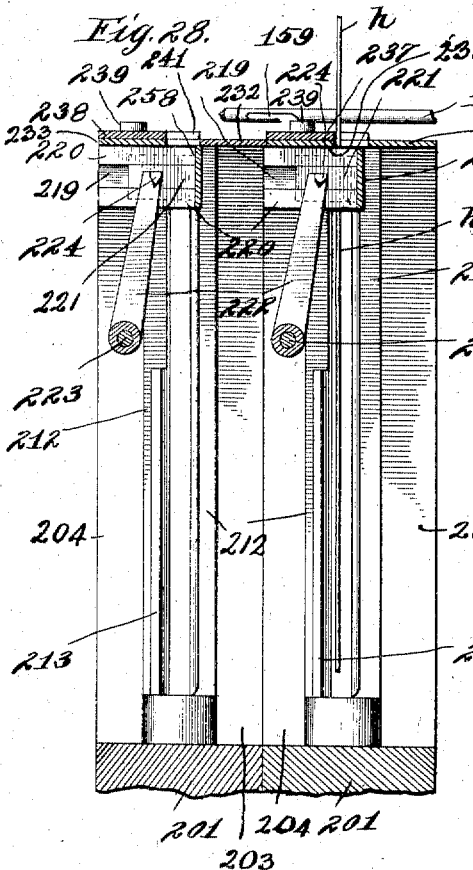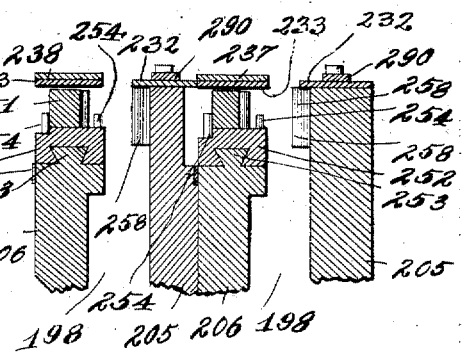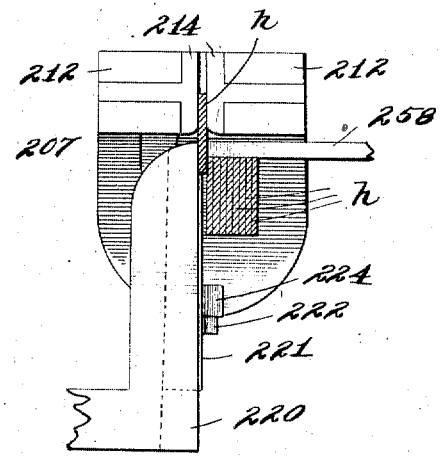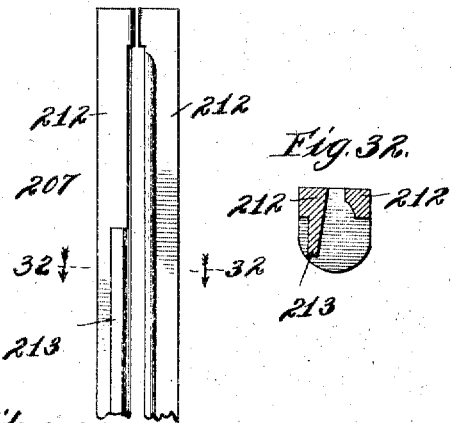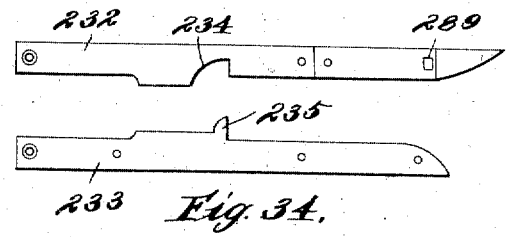

H. D. COLMAN.
MACHINE FOR PREPARING WARPS FOR WEAVING.
APPLICATION FILED OCT. 12, 1904.
1,211,677. Patented Jan. 9, 1917.
17 SHEETS—SHEET 14.
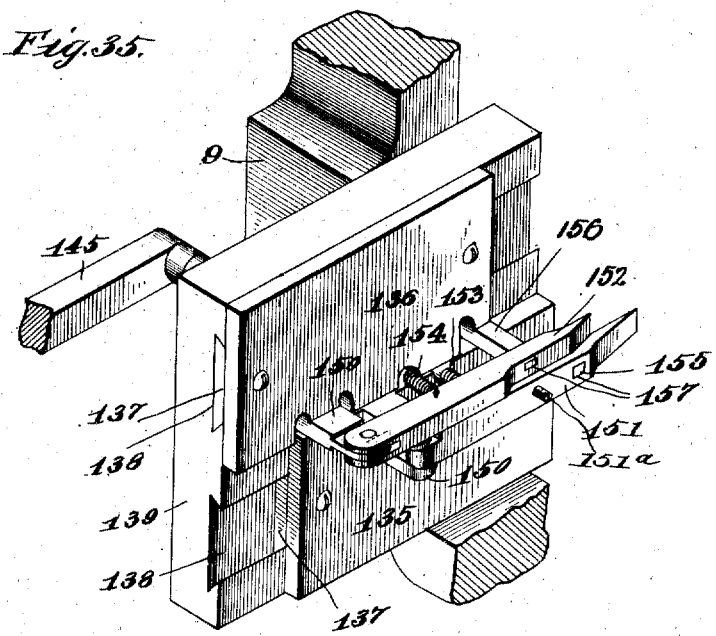
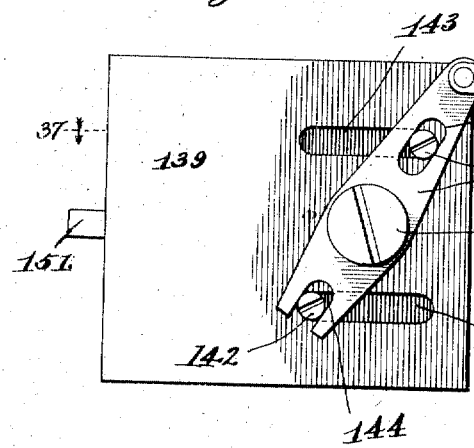
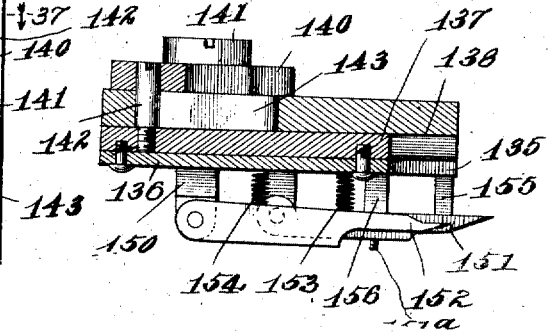
Witnesses.
G. A. Naubenschmidt
George L. Chindahl
Inventor,
Howard D. Colman
By Luther L. Miller
Atty

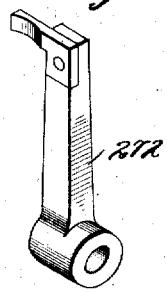
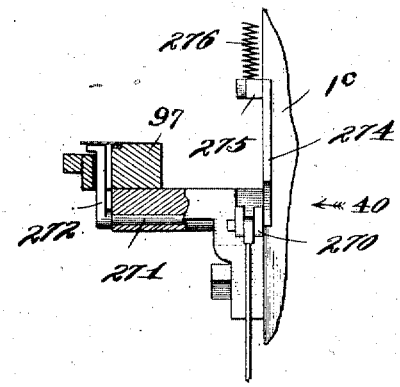
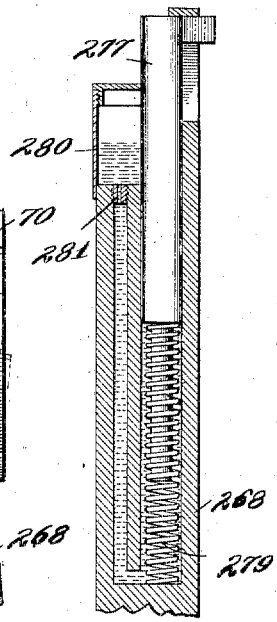
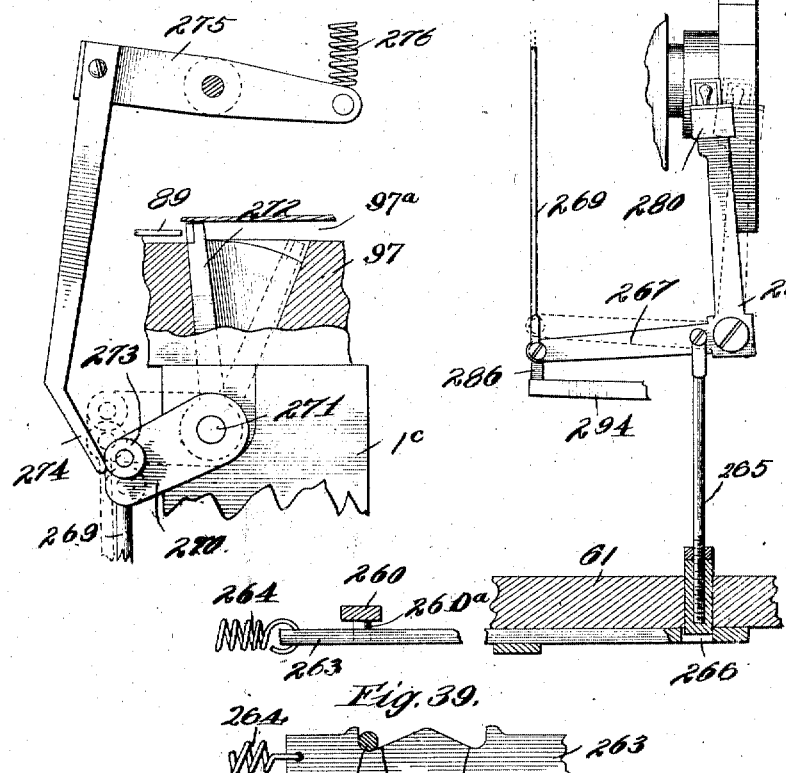

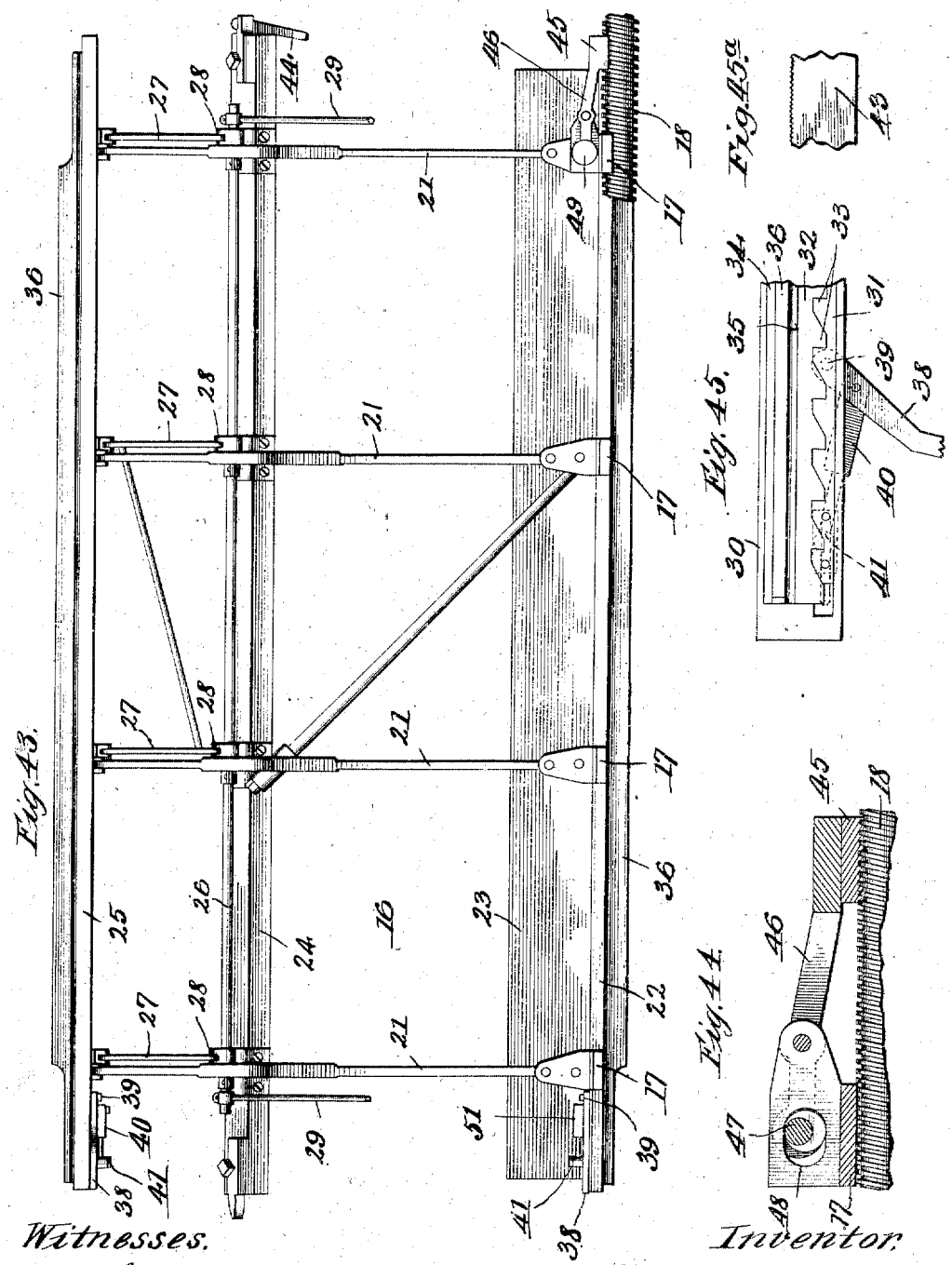

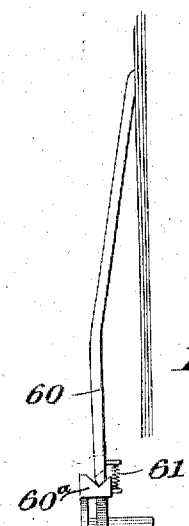
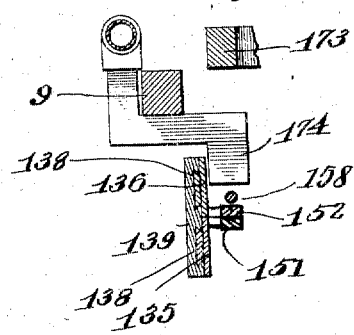
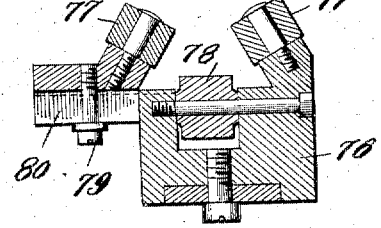
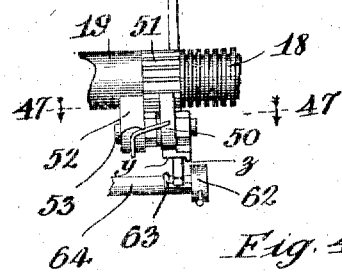
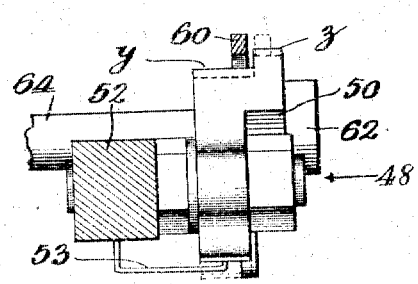
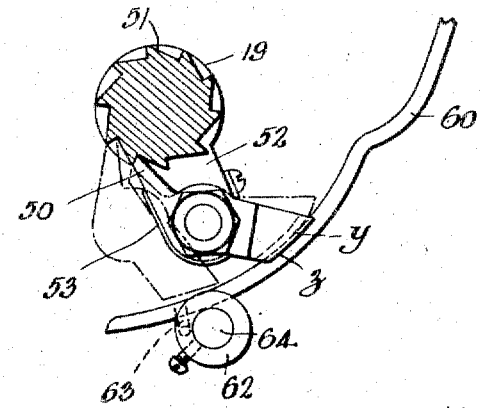

UNITED STATES PATENT OFFICE.

HOWARD D. COLMAN, OF ROCKFORD, ILLINOIS, ASSIGNOR, BY MESNE ASSIGNMENTS, TO HOWARD D. COLMAN, LUTHER L. MILLER, AND HENRY A. SEVERSON, COPARTNERS DOING BUSINESS AT ROCKFORD, ILLINOIS, AS BARBER-COLMAN COMPANY.

MACHINE FOR PREPARING WARPS FOR WEAVING.

1,211,677.  Specification of Letters Patent.  Patented Jan. 9, 1917.

Application filed October 12, 1904. Serial No. 228,240.

*To all whom it may concern:*

Be it known that I, HOWARD D. COLMAN, a citizen of the United States, residing at Rockford, in the county of Winnebago and State of Illinois, have invented certain new and useful Improvements in Machines for Preparing Warps for Weaving, of which the following is a specification.

One of the objects of this invention is the production of a mechanism for placing warp threads between the splits of a reed and through the heddle eyes of a metallic harness.

The invention further refers to means for supporting the reed and for feeding it with relation to the drawing-in mechanism.

The invention also refers to a means for supporting the harnesses, and to a sensitively-controlled feed for advancing said harnesses with relation to the drawing-in mechanism.

The invention further refers to mechanism for selecting a single heddle in proper rotation from each of the harnesses, and for facing the heddle so selected with its eye toward the drawing-in needle.

The invention further refers to an automatic stop mechanism adapted to be actuated when the heddle-selecting mechanism fails to grasp a heddle.

The invention also relates to the production of improved means for holding a warp while the individual threads thereof are being operated upon.

The invention further relates to the selection of threads, singly and successively, from a warp. A further object of the invention is to provide means for severing selected threads in order to produce loose ends to be drawn in or otherwise operated upon.

A further object is to provide means for stopping the machine in case the selecting means fails to take a thread from the warp.

Figure 2:
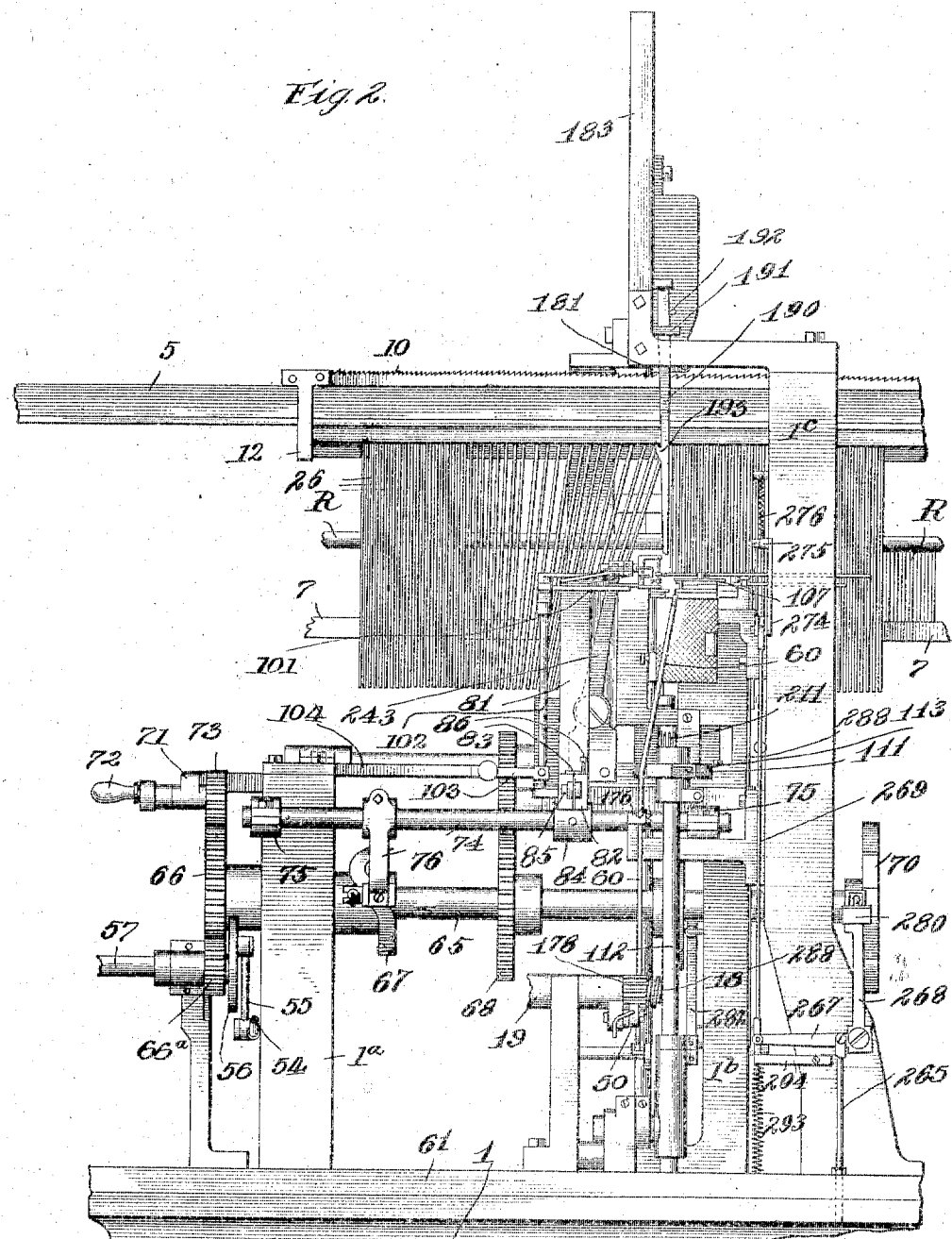
Figure 3:
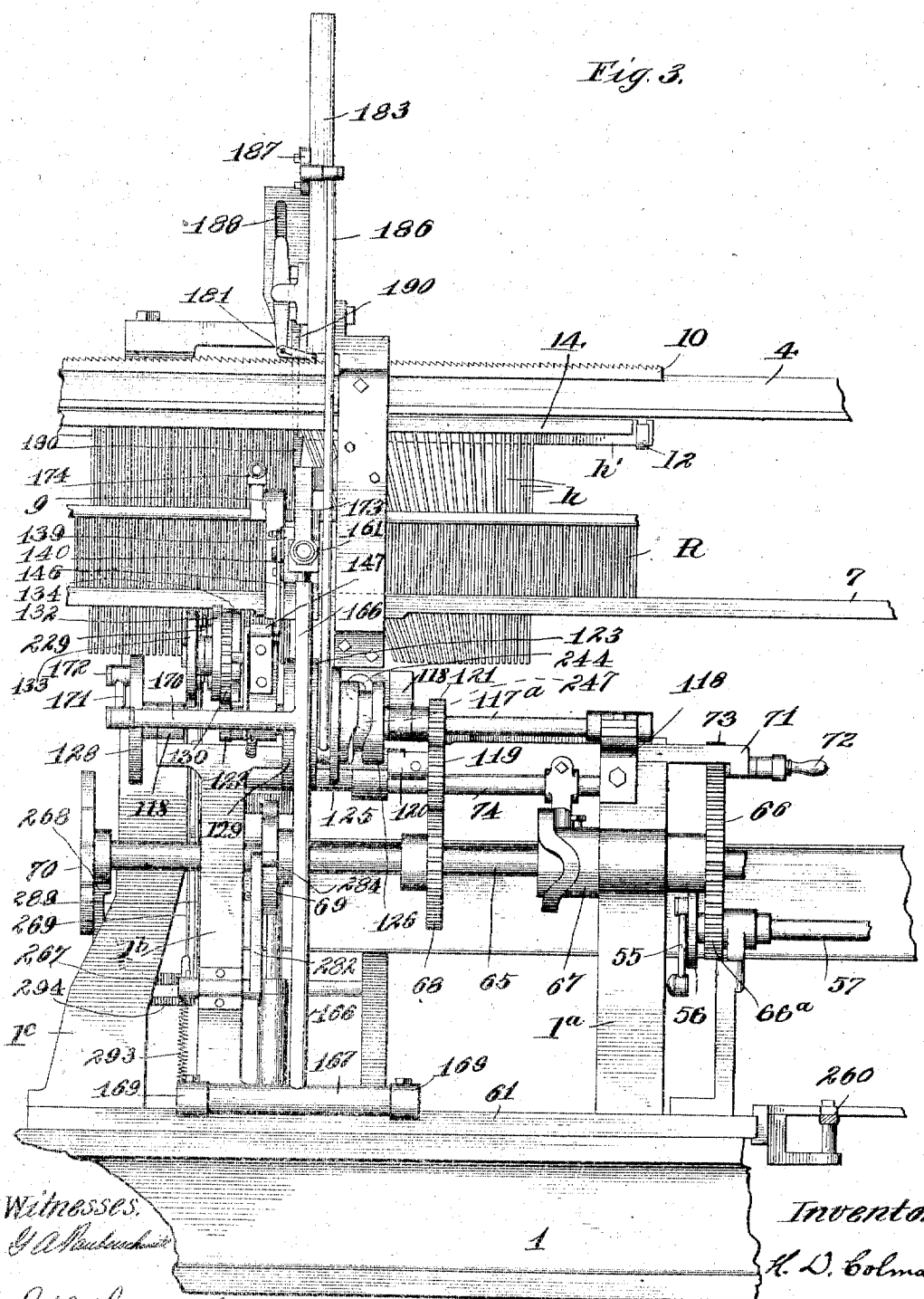
Figure 4:
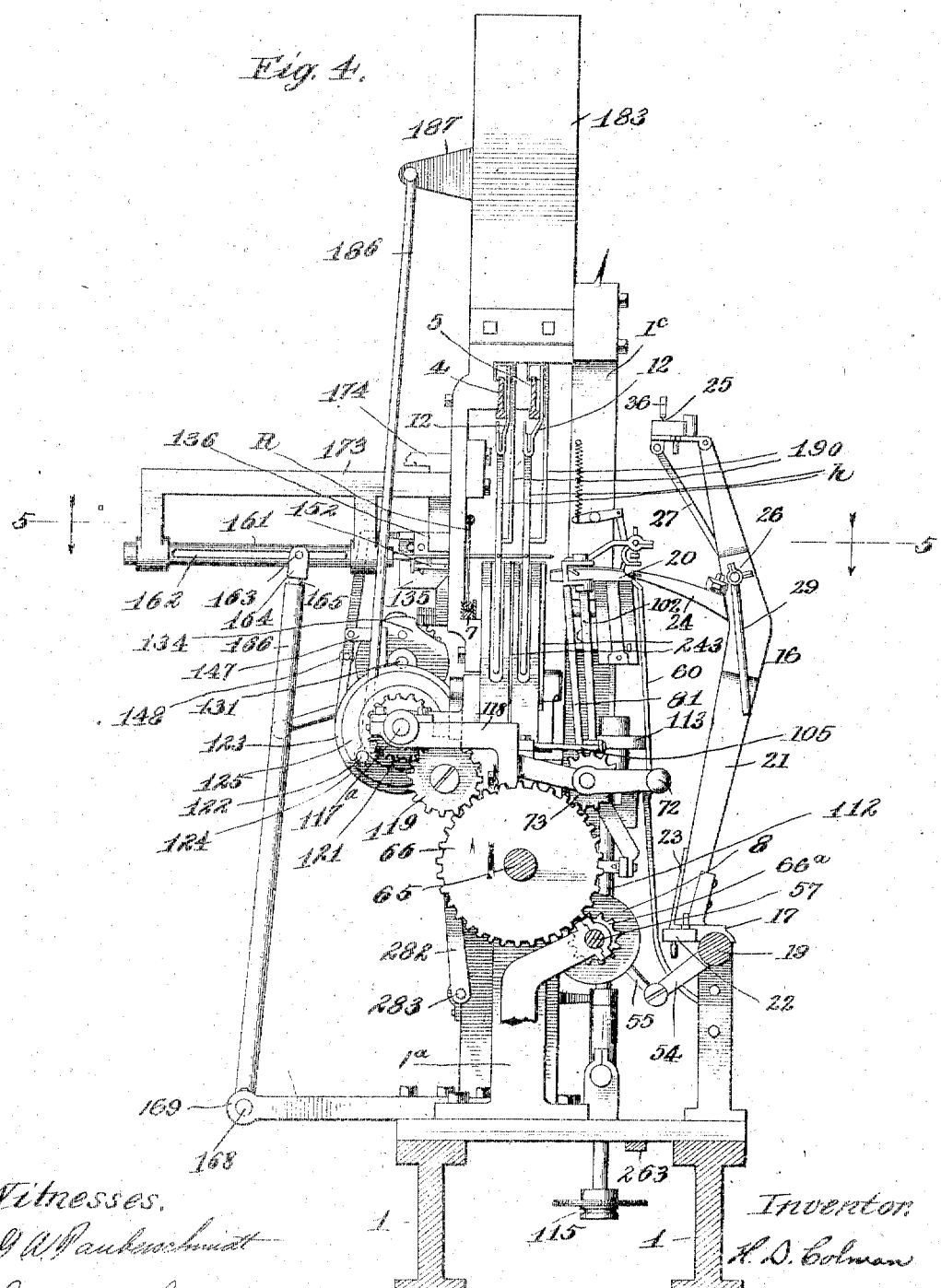
Figure 5:
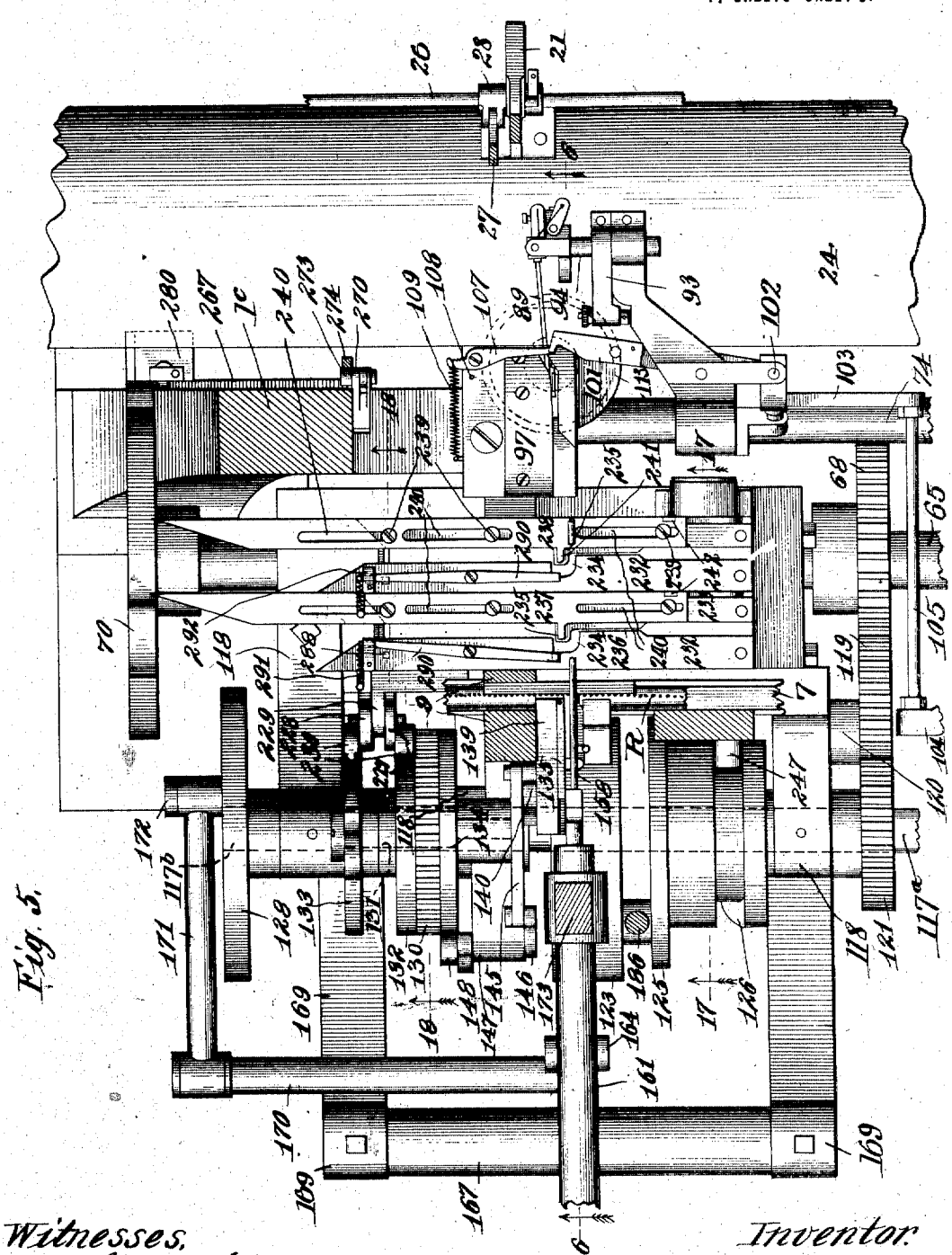

In the accompanying drawings, Figure 1 is a side elevation of a warp-drawing machine embodying the features of my invention, a portion of the warp carriage and of the frame of the machine being broken away. Fig. 2 is a similar view, but on a somewhat larger scale, of the principal parts of the mechanism. Fig. 3 is a rear side elevation of the parts shown in Fig. 2. Fig. 4 is a vertical section through the machine taken on dotted line 4 4 of Fig. 1. Fig. 5 is a horizontal section on dotted line 5 5 of Fig. 4. Fig. 6 is a vertical section on dotted line 6 6 of Fig. 5. Fig. 7 is a plan view of the thread-selecting mechanism and the thread guide. The selector in this view is illustrated as being near its outermost position. Fig. 8 is a view similar to that of the last preceding figure, showing the selector near the innermost limit of its movement and the stripper about to engage the thread to take it off from the selector. Fig. 9 is a perspective view illustrating the relative positions of the selector, the stripper, and the needle just before the thread enters the hooked eye of the needle. Fig. 10 is a plan view of the thread guide showing the relative positions of the selector, the stripper, and the needle immediately after the thread has entered the hooked eye of the needle. Fig. 11 is a vertical section on dotted line 11 11 of Fig. 10, showing the thread guide and the thread-holder. Fig. 12 is a fragmental section on dotted line 12 12 of Fig. 11. Fig. 13 is a horizontal section on the plane of dotted line 13 13 of Fig. 12. Fig. 14 is a side elevation of the thread-selecting means. Fig. 15 is a horizontal sectional view on dotted line 15 15 of Fig. 14. Fig. 16 is a fragmental view in side elevation, showing the eccentric for adjusting the vertical angle of the selector. This view is taken from the side of the arm opposite to that seen in Fig. 14. Fig. 17 is a vertical sectional view on dotted line 17 17 of Fig. 5, showing the means for actuating the pusher slides. Fig. 18 is a similar view on dotted line 18 18 of Fig. 5, showing the means for actuating the selector slides, also showing a portion of the stop mechanism for the heddle-selectors. Fig. 19 is a horizontal sectional view taken on dotted line 19 19 of Fig. 18, showing a portion of said heddle-selector stop mechanism. Fig. 20 is a horizontal sectional view on dotted line 20 20 of Fig. 18, illustrating a portion of the actuating means for the heddle-selectors. Fig. 21 is a perspective view of the harness-feed mechanism. Fig. 22 is a sectional view showing the relative positions of the harnesses and their feed slides. Fig. 23 is a sectional view showing the means for supporting the harnesses from the harness feed slides. Fig. 24 is a fragmental sectional view of one of the harnesses and its spacer. Fig. 25 is a side elevation of the heddle-facers, bunchers, selectors, and pushers. Fig. 26 is a horizontal section on dotted line 26 26 of Fig. 25. Fig. 27 is a similar view showing a number of heddles pushed by the buncher mechanism into position to be taken one by one by the heddle-selectors. Fig. 28 is a vertical section on dotted line 28 28 of Fig. 26. Fig. 29 is a similar view taken on dotted line 29 29 of Fig. 26. Fig. 30 is a top plan view of one of the facers and selector-slides, showing a heddle being pushed by the selector-slide into the facer. Fig. 31 is an elevation of the upper end of one of the facers. Fig. 32 is a horizontal sectional view on dotted line 32 32 of Fig. 31. Fig. 33 is a top plan view of one of the facing plates for the "boxes" that contain the heddle facers and selectors. Fig. 34 is a similar view of the other facing plate for said "boxes." Fig. 35 is a perspective view of the mechanism for feeding the reed and for spreading the splits thereof to permit the passage of the needle. Fig. 36 is a side elevation of said mechanism, looking from the side opposite to that seen in Fig. 35. Fig. 37 is a horizontal section through said mechanism on dotted line 37 37 of Fig. 36. Fig. 38 illustrates in front elevation the automatic stop mechanism. This mechanism is intended to operate when one of the heddle selectors fails to move a heddle into the facer or the thread-selector fails to catch a thread. The figure shows parts broken away to illustrate the trigger lever acted upon by the thread-selector, also to show the detent device for the belt shifter. Fig. 39 is a fragmental plan view of the sliding rod that connects the automatic stop mechanism with the belt shifter. Fig. 40 is an enlarged detail looking in the direction of the arrow 40 in Fig. 38, showing in side elevation, the automatic stop mechanism that operates when the selector fails to catch a thread. Fig. 41 is a perspective view of the trigger lever shown in side elevation in the last preceding figure. Fig. 42 is a vertical section through the cushion stop mechanism. Fig. 43 is a side elevation of the warp carriage. Fig. 44 is a view, partly in section, illustrating the feed connection between the warp carriage and the screw-threaded feed shaft. Fig. 45 is a fragmental view of one of the clamps for holding the warp threads in the warp carriage. Fig. 45ª is a fragmental view of the warp-deflecting ribbon. Fig. 46 illustrates the sensitive mechanism that controls the feed of the warp carriage. Fig. 47 is a sectional view on dotted line 47 47 of Fig. 46. Fig. 48 is a side view of the parts shown in Fig. 47, looking in the direction of the arrow 48 in Fig. 47. Fig. 49 is a sectional view on dotted line 49 49 of Fig. 6, showing the air-tube for receiving the ends of the threads after said threads have been drawn through the heddles and the reed. Fig. 50 is a sectional view of the bearing rollers that engage the periphery of the cam for actuating the thread-selector.

In the embodiment herein shown of this invention I provide a supporting frame comprising the bed 1 having the usual supporting legs 2. At the rear side of the bed and secured to the rear face thereof are two upwardly extending supporting arms 3, which arms at their upper ends carry two parallel guide rails 4 and 5 for the harness slides. Below said rails and set off (forwardly) from said supporting arms by the brackets 6, the supporting arms 3 carry the guide bar 7 having a groove 8 formed in its upper edge and a guide 9 for receiving and guiding the reed R (Fig. 6), said reed lying loosely within its groove and guide. Each of the harness slides comprises a feed bar 10 (Figs. 21, 22, 23, and 24) having ratchet teeth 11 formed in its upper face, each of said feed bars resting upon the upper edge of one of the guide rails 4 and 5 and being adapted to be slid lengthwise of said guide rails. At their ends upon their near sides the feed bars 10 carry harness-supporting hooks 12, within which hooks the ends of the harness rods $h'$ are adapted to lie. Upon these harness rods are strung the steel heddles $h$. In order to separate the heddles into small groups and to prevent their sliding to one end of their rods $h'$ I provide a spacer 13 for each harness, said spacers consisting of two parallel side pieces 14 held a little distance apart by rivets 15 set at frequent intervals throughout the length of the side pieces. The spacers are placed upon the harness rods $h'$ directly beneath the guide rails 4 and 5, the rivets 15 holding the heddles in suitable bunches throughout the length of said harness-rods.

The ends of the warp threads (from the warp beam, not shown) to be drawn into the eyes of the harness and between the splits of the reed are supported in a carriage 16 (Figs. 1, 4 and 43) resting by means of the feet 17 upon a lead-screw 18 and a rock shaft 19, said screw and shaft being alined and being supported adjacent to the front side of the bed 1. The warp carriage leans against a short stationary ledge 20 (Figs. 6, 7 and 12). The warp carriage 16 comprises the bowed arms 21 secured rigidly together at their lower ends by the clamp 22 and the guard plate 23, and near their middle portions by a bar 24. At their upper ends the arms 21 support a similar clamp 25, but this clamp is pivotally mounted upon said arms and is movable with relation to the clamp 22 by means of a rock shaft 26 extending lengthwise of the warp carriage and mounted in suitable bearings in the arms 21. Pivotal connecting links 27 extend between the clamp 25 and arms 28 fixed upon the rock shaft 26; thus when said rock shaft is oscillated by either of the hand levers 29 the clamp 25 is moved with relation to the clamp 22. The clamps 22 and 25 are uniform in construction. (Figs. 6 and 45.) Each comprises a channel-shape frame 30, said frames being set to face away from each other upon opposite sides of the carriage 16. Within the frame 30 of each clamp, two wedge bars 31 and 32 are placed, the adjacent faces of said bars being provided with oppositely inclined wedging teeth 33. The wedge bar 31 lies in contact with one of the inner side walls of the frame 30, and is adapted to receive a longitudinal movement therein. The other inner side wall of the frame is provided with a facing 34 of rubber or other yielding material, and the corresponding face of the wedge bar 32 has a similar facing 35. Threads of a warp to be held in the carriage 16 are pushed into the clamp between the rubber facings 34 and 35 by means of an insertion bar 36 over which the warp threads are laid. To hold the threads more firmly in the clamp the insertion bar is provided with longitudinal ribs 37 (Fig. 6) adapted to indent the rubber facings 34 and 35. The wedge bar 31 is moved longitudinally and the clamp thereby opened and closed by means of a lever 38 pivotally mounted by means of a stud 39 upon the inner side of the frame 30, and a toggle lever 40 pivotally connecting said lever 38 with a stud 41 on the wedge bar 31.

The bar 24 projects rearwardly from the arms 21 beyond a straight line drawn between the two clamps 22 and 25, and in its rear edge is formed a longitudinal groove 42 (Fig. 6), in which groove lies a ribbon 43 having a milled or otherwise roughened outer edge. When threads are placed in the carriage 16 and clamped in the clamps 22 and 25 thereof, they are bent over the roughened edge of the ribbon 43. When a warp has been so clamped, the clamp 25 is moved away from the clamp 22 by turning the rock shaft 26, thus placing tension upon the threads, after which the threads are deflected sidewise between their points of support by moving the ribbon 43 longitudinally in its groove 42 in the bar 24, which longitudinal movement is imparted to the ribbon by means of a lever 44 (Fig. 43) pivotally mounted at the end of the bar 24 and likewise pivotally connected with the ribbon. The purpose of thus deflecting the warp threads sidewise after they have been clamped and stretched in the warp carriage is so that, when each individual warp thread, is released from the roughened edge of the ribbon 43 by the selector, said thread shall tend to straighten and move away from the body of the warp threads, thus assisting in the separation of the threads.

The warp carriage 16 is releasably connected to the lead screw 18 by means of a half-nut 45 carried by an arm 46 pivotally mounted on the carriage. (Fig. 44.) In the rear end of the arm 46 is rotatably supported an eccentric 47 which lies within an elongated opening 48 in the carriage, said eccentric being rotated by means of a milled hand-knob 49 (Fig. 43) to move the half-nut 45 into and out of engagement with the screw 18.

The screw 18 is intermittently rotated by means of a pawl 50 arranged to engage a ratchet wheel 51 which is rigid with said screw. The pawl 50 is pivoted on an arm 52 which is fixed to the rock shaft 19. A spring 53 tends to hold the pawl in engagement with the ratchet wheel. The shaft 19 is rocked by means of an arm 54 rigid with the shaft and connected by a rod 55 to a crank disk 56 fixed on the drive shaft 57. On the shaft 57 is a tight pulley 58 and a loose pulley 59 (Fig. 1).

The means for sensitively controlling the feed of the warp carriage comprises a finger 60 (Figs. 2 and 46) suspended on knife-edge bearings 60ª, the upper end of said finger lying in the path of the warp threads as the latter are presented to the selector. The lower end of the finger 60 is curved to underlie the rear end of the pawl 50. The rear end of the pawl comprises the parts y and z, the latter extending farther to the rear than the former.

The operation of the warp feed is as follows: Assuming that the warp is so located with reference to the selector that a feed movement shall occur, the lower end of the finger 60 is then in the position shown in Fig. 47. The pawl 50 moves forward (to the left, Fig. 48), thereby turning the ratchet wheel through the distance of one tooth, and thus advancing the warp carriage. If the warp is thereby brought into proper position with reference to the selector, the pressure of the foremost warp thread against the finger 60 causes the lower end of the finger to swing into the path of the backward movement of the part z of the pawl. As the pawl swings back, the part z rides up on the finger 60, thereby raising the forward end of the pawl sufficiently so that on the next forward stroke it will not engage the next tooth of the ratchet wheel; hence the warp carriage will not be advanced. By the time the removal of threads by the selector or the spacing of the threads necessitates another movement of the warp carriage, the lower end of the finger 60 will have swung out of the path of the part z, so that the pawl may engage the next tooth of the ratchet wheel. The position of the warp carriage is thus automatically adjusted so as properly to present threads to the selector. A light spring 61 normally holds the upper end of the feeler finger in contact with the foremost thread. Stops 62 and 63 limit the oscillatory movement of the finger 60. Said stops are carried by a fixed rod 64 that serves as an abutment to prevent rearward displacement of the lower end of the feeler finger due to the pressure of the part z of the pawl.

Upon the bed 1 are two upwardly extending bearing posts 1ª and 1ᵇ and adjacent to the bearing post 1ᵇ an upright supporting standard 1ᶜ. (Fig. 2.) A main shaft 65 is rotatably mounted over the bed plate 61 in suitable bearings in the posts 1ª and 1ᵇ, and this shaft carries a gear 66 adapted to mesh with a pinion 66ª on the drive shaft 57, a cam 67 for imparting a combined sidewise and forward and back movement to the thread-selector, a drive gear 68 for transmitting motion to the harness and reed-operating devices, a cam 69 (Figs. 3 and 6) for imparting motion to a stop device to be acted upon by the heddle-selecting mechanism, and a stop disk 70. A bracket 71 fixed to and extending from the side of the post 1ª rotatably supports a hand crank 72 to which is fixed a pinion 73. The pinion 72 meshes with the gear 66 and by means of the crank 73 motion may be transmitted to the entire mechanism by hand. A rock shaft 74 is supported in bearing brackets 75 projecting from the post 1ª and the standard 1ᶜ. Oscillatory and longitudinally reciprocatory movements are imparted to said shaft by the cam 67, an arm 76 fixed to said shaft engaging the periphery of said cam by means of the side rollers 77 and the face roller 78. (Fig. 50.) One of the side rollers 77 is adjustable relatively to its supporting arm 76 by means of a set screw 79 movable within an elongated opening 80 in the arm 76.

The thread-selecting mechanism (Figs. 2, 7, 14, and 15) comprises an arm 81 having a hub 82 that fits upon a stud 83 projecting upwardly from a collar 84 fixed upon the rock shaft 74. The hub 82 is clamped on the stud 83 by means of a screw 85. The vertical position of the arm may be adjusted by means of a screw 86 passing through a threaded opening in the hub 82, the lower end of said screw impinging upon the collar 84. The cam 67 imparts to the upper end of the arm 81 a motion somewhat triangular in outline, said arm moving inward toward the warp threads, forwardly away from the body of warp threads, and diagonally outward to its first position. The upper end of the arm 81 carries a yoke 87 (Fig. 14) within which is mounted between cone bearings 88 a shaft 89ª. To the shaft 89ª is fixed a selector 89. A torsion spring 90 anchored at one end to a part fixed to the yoke 87 and attached at its other end to an arm 89ᵇ fixed on the shaft 89ª tends to swing the selector toward the warp.

91 is a stop screw carried by the arm 89ᵇ and adapted to impinge upon the yoke 87 to limit the action of the spring 90.

The adjustment of the inclination of the selector with reference to the vertical is accomplished by means of an eccentric 92 connected with the outer end of an arm 93, which arm is fixed to the stem 94 of the yoke 87. A latch 95 is pivoted upon the yoke 87. When the latch is turned to engage the arm 89ᵇ, the selector is thrown out of engagement with the warp threads. The selector is offset slightly toward the body of warp threads, and is provided on the side toward the threads with two or more thread hooks or pockets 96, the one near the forward end of the selector being smallest in size, and the next one slightly larger, increasing from first to last. The purpose of these thread hooks is to grasp a warp thread, and as it is necessary that only one thread be taken by the selector at each stroke thereof the first hook is made of a size to receive a single small thread. If the first hook is too small to take the thread presented, the second hook, being larger, probably will receive it; if not, the third. If the first hook was made large enough to receive a large warp thread it sometimes would grasp two small threads, hence the graduation in size of said hooks.

As hereinbefore explained, the warp threads extend across the roughened edge of the ribbon 43 and are deflected (toward the right, Fig. 7) out of a vertical plane. The selector 89 reciprocates transversely of the ribbon. As the selector moves forward, one of its hooks picks up the foremost warp thread. As soon as the thread is lifted out of contact with the edge of the ribbon, the thread springs into or toward the vertical plane passing through the clamped ends of the thread, the selector yielding laterally against the tension of the spring 90. Continuing its forward movement, the selector carries the thread against a device for guiding and releasably holding the thread. Said device comprises a guide 97 having a passage v for the thread, said passage having an oblique wall x along which the thread is drawn as the selector advances. By means of said oblique wall, the thread and the selector are deflected (to the left Fig. 7) far enough so that the next hook of the selector cannot take a thread from the warp. Beyond the oblique wall x is a guide edge t along which the thread is pulled by the selector. In the advancing movement of the selector, the thread is carried against a cutter disk, to be later described, whereby the thread is severed and a free end thus provided for the drawing-in operation. To hold said free end and prevent it from jumping and tangling when the tension of the thread is suddenly relieved by the severing operation, I provide below the guide 97, a friction thread-holder 98 lined with plush. Between the edge t and the thread-holder 98 the thread is held by a spring finger 99, the tension of which may be adjusted by means of a set-screw 100. As the selector advances the thread is carried into the thread-holder and under the spring finger and severed.

A stripper 101 (Figs. 5 and 7) is fixed at the upper end of an oscillatory shaft 102 (Figs. 2 and 4) mounted in suitable bearings on the arm 81. This shaft is oscillated and the stripper 101 moved forward and backward with relation to the arm 81 and the selector 89 by means of an arm 103 fixed to the lower end of said shaft, an arm 104 secured to a part of the supporting frame, and a connecting rod 105 having ball-and-socket connections with said arms 103 and 104. When the arm 81 is moved forward the stripper also moves forward with relation to said arm. In the continuing movement of the arm 81, the stripper is caused to swing forward and take the thread from the selector, the thread then extending from the thread-holder 98 through a notch 106 (Figs. 10 and 12), through the hook of the stripper to the upper warp clamp 36. The purpose of the stripper is to bring the thread to a definite and uniform position with reference to the needle, notwithstanding the fact that the thread may have been taken by any one of the selector hooks. The stripper also catches any selected thread that may escape from the selector.

A detaining finger 107 is pivotally mounted near the forward side of the thread guide and is yieldingly held forward against a stop 108 by means of a coiled spring 109. The finger 107 yields to allow the selected thread to pass it. The purpose of this finger is to hold back a second warp thread that may be adhering (at a point or points other than the point of selection) to the one carried forward by the selector. As soon as the selected thread has passed the finger 107, said finger springs into the space between the selected thread and the next succeeding thread and thus acts to hold back the latter thread. To prevent such second warp thread from springing so far to the left (Fig. 8) that the next hook of the selector would catch it, I provide a stop shoulder w located at the entrance to the passage v.

The thread-severing means above referred to comprises, in the present embodiment, a cutter disk 111 (Fig. 6) fixed near the upper end of a rotary shaft (not shown) which is mounted within a stationary sleeve 112 fixed in the frame of the machine. The disk is located below the friction thread-holder 98, and is covered by a housing 113 open at one point to permit the thread to be pushed in the forward movement of the selector against the disk in order to sever the thread. The cutter disk 111 is rotated by a belt 114 (Fig. 1) passing over a sheave 115 fixed to the lower end of the cutter shaft, said belt also running over a sheave 57$^a$ on the drive shaft 57 and under guide sheaves 114$^a$ rotatably supported within the bed 1.

Referring now to Fig. 5, two alined shafts 117$^a$ and 117$^b$ are rotatably mounted upon brackets 118 fixed upon and extending rearwardly from the posts 1$^a$ and 1$^b$. Motion is transmitted to the shaft 117$^a$ from the gear 68 on the main shaft 65 by means of an intermediate gear 119 (Fig. 3) rotatably mounted upon a stud 120 extending from the post 1$^b$ and a gear 121 fixed upon the shaft 117$^a$. The shaft 117$^a$ is driven in the ratio of two to one with relation to the shaft 65. The shafts 117$^a$ and 117$^b$ are connected to rotate together by means of a crank pin 122 (Fig. 4), which pin is fixed with relation to a disk 123 secured to the shaft 117$^b$ and lies within an opening 124 in a disk 125 fixed to the shaft 117$^a$. The shaft 117$^a$ also carries a cam 126 (Fig. 5) for operating the pusher slides for removing the heddles from the facer mechanism to be hereinafter described. The shaft 117$^b$ carries a pinion 127, a crank disk 128 adapted to operate the needle to be hereinafter described, and a cam 129 (Fig. 6) for oscillating the heddle facers. The pinion 127 meshes with a gear 130 (Figs. 3 and 18) carried by a supplementary cam shaft 131, which supplementary cam shaft also carries two cams 132 and 133 fixed on said shaft for actuating the heddle-selecting device. It also carries a cam 134 (Fig. 6) for operating the reed feed and spreader.

As hereinbefore stated the reed R is supported on the grooved bar 7 and in the guide 9. It is arranged to be fed longitudinally upon said grooved bar by means of the feed to be next described. (See Figs. 35, 36, and 37.) Two slides 135 and 136 are mounted on guides 137 sliding in ways 138 in a block 139 secured to the guide 9, and are adapted to have a reciprocatory motion toward and from the reed. Motion is imparted to said slides by means of a rock arm 140 pivotally mounted by means of a screw 141 upon the rear side of said block 139, pins 142 being fixed with relation to said slides and extending through elongated openings 143 in said block and lying within openings 144 in said rock arm. The upper end of the rock arm is pivotally connected by means of a link 145 with a lever 146 (Fig. 6) rotatably supported in suitable bearings in the bracket 147, one arm of which lever carries a roller 148 adapted to engage the cam 134 upon the supplementary cam shaft 131. A spring 149 connected at one end with the lower arm of said lever, and at its opposite end with a fixed point in the post 1$^b$ holds the roller 148 in contact with said cam and moves the lever in one direction. At their adjacent edges, each of the slides 135 and 136 has a post 150 extending outwardly from its face, upon which posts are pivotally mounted a feed dog 151 and a spreading dog 152. The forward ends of these dogs are chisel-pointed, and the point of the feed dog 151 is offset slightly with relation to the spreading dog 152, in the direction from which the reed approaches. Springs 153 and 154 tend to draw the forward ends of these dogs toward their slides 135 and 136, to the extent permitted by the guide studs 155 and 156, the reduced outer ends of which studs project through openings 157 in said dogs. An oscillatory movement communicated to the rock arm 140 by means of the connecting rod 145 moves the slides in opposite directions. The dog 152 entering between the splits of the reed spreads said splits sufficiently for the passage of the needle to be hereinafter described. The feed dog 151 being offset with relation to the spreading dog 152, is inserted into the next successive opening in the reed when the spreading dog is nearly withdrawn. The dog 151 enters the reed before the spreading dog is withdrawn, so that certainty of action in the feed movement of the reed is assured. By reason of the wedging conformation of the point of the feed dog 151, the forward movement of said feed dog advances the reed on its grooved bar 7, the distance of one reed space, swinging the spreading dog 152 against the action of its spring 154. Upon the withdrawal of the spreading dog from the reed said spring moves said dog toward its slide 136 so that upon its next forward movement it enters between the same dents of the reed with the feed dog 151. In order to adjust the feed to reeds having splits of different widths, the free end of the feed dog 151 is made adjustable toward and from its slide 135 by means of a screw 151$^a$ extending through a threaded opening in said dog and contacting the side of the slide 136.

The needle 158 (Fig. 6), which has a hooked eye 159 at its forward end (Fig. 9), is carried at the forward end of a rod 160 slidably mounted within a guide tube 161, which guide tube is provided in its opposite sides with elongated openings 162 (Fig. 4). Through these openings pins 163 in the arms of a yoke 164 extend, said pins being fixed in the rod 160. The stem 165 of the yoke 164 lies within the upper end of a tubular operating arm 166 and is free to slide in said arm. The operating arm at its lower end is secured to a sleeve 167 (Figs. 3 and 4), which sleeve is mounted upon a shaft 168 lying within bearings 169 fixed in the machine frame. The arm 166 has a projection 170 (Fig. 5) extending from its side, the outer end of which projection is pivotally connected by means of a rod 171 with a wrist-pin 172 fixed upon the disk 128 carried by the shaft 117$^b$, by means of which the operating arm is oscillated and the needle reciprocated. The guide tube 161 is supported from the post 1$^b$ by means of a bracket 173.

A suction air-tube 174 (Figs. 3, 6, and 49) is supported upon the guide 9 with its mouth above the needle and at the rear side of the reed. An exhaust air current is induced in said tube by means of a fan (not shown) connected with the tube in any suitable manner. After being drawn through the heddle eye and the reed by the needle, the end of the thread is caught by the air current passing through the tube 174, and is drawn into said tube, where it is held until withdrawn by the advance movement of the reed.

The harness feed will next be described. (See Figs. 2 and 21).

Two pawls 181, adapted to engage the ratchet teeth formed in the upper faces of the feed bars 10, are pivotally supported at the lower end of a rock arm 182, which rock arm is mounted upon a bracket 183 fixed to the supporting post 1$^b$ and the standard 1$^c$. A slide 184 is mounted in a vertical guide-way 185 in the upper portion of the bracket 183, and is arranged to be reciprocated therein by means of a connecting rod 186 (Figs. 3, 4 and 5) extending between an arm 187 fixed to said slide and the wrist-pin 122 upon the face of the disk 123. A grooved cam 188 on said slide is adapted to engage a stud 189 projecting from the rock arm 182, which cam causes said rock arm to be oscillated to move the pawls 181 forward and back. If not withheld from engagement with the feed bars 22, the pawls 181 would feed the harness slides forward at each reciprocation of the slide 184. To limit the advance of the harnesses to the necessities of the work, I provide two feelers 190 pivotally mounted upon the slide 184, their lower ends engaging the forward side of that heddle of each harness which is in position to be next taken by the selector-mechanism. Guides 191 on the slide 184 prevent lateral movement of the feelers 190, and stop pins 192 limit pivotal movement of said arms in one direction. Between their ends and upon their forward edges the feelers are provided with hooks 193, which are adapted to engage pins 194 extending from the sides of the pawls 181. The feelers 190 being connected with the slide 184 are reciprocated with said slide. When a heddle is in position to be engaged by its selector-mechanism the feeler for that harness is held forward so that at each upward movement of the slide the hook 193 of said feeler engages the pin 194 of the corresponding pawl 181, raising said pawl upwardly from engagement with the ratchet teeth of the harness slide during the forward feed movement of the pawl. When either one of the feelers 190 is not engaged by a heddle of its harness said feeler swings rearwardly by gravity a sufficient distance to avoid catching the pin 194 upon the pawl for moving said harness. As a consequence, said pawl is not raised from engagement with its rack during one forward movement of said pawl, and said harness slide is given a forward movement. Either or both of these slides will be fed forwardly in this manner, one tooth at a time, until the feelers are held forwardly by heddles in their respective harnesses.

The buncher, selector, facer and pusher mechanisms will next be described. (See Figs. 6, 26, and 27).

Boxes 195 and 196 placed side by side, are secured upon the upper face of a horizontally extending plate 197 fixed to the post 1$^b$. These boxes are identical in construction. Each box has a longitudinal heddle-receiving channel 198 and a transverse passage 199 in its upper portion, and a transverse opening 200 in its lower portion. The passage 199 and the opening 200 are separated by a horizontal web 201. Each box has a base portion 202. The channel 198 and the transverse opening 199 form the upper end of each of the boxes into two pairs of vertical arms, the forward pair consisting of the arms 203 and 204, the rearward pair of the arms 205 and 206.

Oscillatory facers 207 are supported upon shafts 208 which are mounted in bearing openings 209 and 210 in the web portions 201 and the base portions 202 of the boxes 195 and 196, said shafts between said base and web portions being provided with pinions 211. Each of the facers 207 comprises two arms 212 having a slight space between them and offset somewhat from its supporting shaft. A lip 213 (Figs. 28 and 32) on one of the arms 212 serves to guide the lower ends of the heddles into the space between said arms. At their upper ends said arms are provided with the hardened plates 214 (Fig. 30) set quite close together and having between them a narrow space just sufficient to receive a heddle. The facers are oscillated by means of a rack bar 215 (Figs. 6 and 25), the rear end of said rack bar carrying a roller stud 217 that lies within the cam-groove of the cam 129. The throw of this cam is sufficient to oscillate both facers through one-quarter of a revolution, in order to twist the lower ends of the heddles into such position that the heddle eyes face the needle 158 and are in line therewith.

The heddles are taken singly and in regular sequence and moved into the facers 207 by selector mechanisms, each of which comprises a slide 218 (Fig. 25) mounted in a guideway 219 in a bracket 220 secured to the side of each of the boxes 195 and 196 and extending into the transverse opening 199 therein. Each of these slides has a portion 221 (Figs. 28 and 30) raised from the surface of its bracket 220 a little less than the thickness of a single heddle, which portion is adapted to engage the edge of a heddle and, when said slide is advanced, push said heddle into the facer. The slides 218 are reciprocated by means of arms 222 fixed upon and extending upwardly from shafts 223, which shafts are rotatably mounted in suitable bearing openings in the arms 206 of the boxes 195 and 196, the upper ends of said arms 222 being bifurcated to receive studs 224 projecting from the faces of the selector slides. Each of the shafts 223 at its opposite end has fixed thereon an arm 225 (Figs. 18 and 25), which arms extend downwardly and are pivotally connected by means of links 226 with rock arms 227 and 228. The rock arms 227 and 228 are mounted upon a bracket 229 fixed with relation to the post 1$^b$. At their upper ends said rock arms carry rollers 230 held in contact with the peripheries of the cams 132 and 133 by means of springs 231 connected with the lower ends of said arms and a fixed support upon a portion of the standard 1$^c$. As the high points of the cams 132 and 133 are diametrically opposite each other, the selector slides 218 are alternately reciprocated at regular intervals.

The upper ends of the arms of the boxes 195 and 196 are provided with longitudinally extending hardened facing plates 232 and 233 (Figs. 5, 33, and 34) on opposite sides of the channels 198, each of the former having a quadrant-shape opening 234 adapted to permit of a quarter rotation of the heddle by the facer, the latter plate having a projection 235 adapted to enter said opening to guide the heddle while being rotated. The heddle is withdrawn from the facer by a pusher mechanism to be later described, and when so withdrawn the heddle is thrust by the pusher mechanism into a narrow opening 236 (Fig. 5) between the plates 232 and 233, which opening is just sufficient in width to admit a single heddle. At other points in their length the facing plates are separated the distance of the width of the heddles, and act as guide plates to hold the heddles away from the sides of the channels 198.

The pusher mechanism will next be described. This mechanism comprises pusher slides 237 and 238 (Figs. 5 and 25) mounted upon the facing plates 233 of each of the boxes 195 and 196. These slides are adapted to have a longitudinal movement with relation to said boxes, being secured to the facing plates by means of screws 239 passing through elongated openings 240 in said slides. They are provided with pusher fingers 241 adapted to engage the faced heddle and after the needle has been withdrawn from the heddle eye to push the heddle into the narrow opening 236. At their rear ends said slides are chamfered upon their far edges, forming guides for the body of heddles of each harness, said slides during reciprocation, tending to push said heddles into a straight line. Near their forward ends the slides 237 and 238 are provided with notches 242, each for receiving the upper end of an arm 243 (Figs. 17 and 25) by means of which longitudinal movement is imparted to said slides. The arms 243 are fixed on an oscillatory shaft 244 (Fig. 17) mounted in suitable bearing openings 245 in the boxes 195 and 196, the rear end of which shaft is provided with a crank arm 246 having a roller 247 that lies in the groove of the cam 126. Motion imparted to the shaft 244 by the cam 126 oscillates the arms 243 and reciprocates the slides 237 and 238. For simplicity of construction I have, in this instance, provided but one cam 126 for the operation of both slides, thus moving both slides together, although it is apparent that only one slide need operate at a time. This remark also applies to the facers and perhaps to other parts of the mechanism.

The buncher mechanism for presenting heddles to the selector-mechanism is shown in Figs. 25, 26, 27, and 29. Near their rear ends the pusher slides 237 and 238 carry collars 248 (Fig. 25) that surround and slide upon rods 249, the forward end of each of which rods is pivotally connected with the bell-crank arm 250 of a buncher finger 251. Each buncher finger is pivotally mounted upon a slide 252 supported upon a guide 253 formed upon the upper end of the arm 206. The oscillatory movement of the buncher finger is limited by means of stop pins 254 fixed in said slide. Near its opposite ends each of the rods 249 carries a fixed collar 255, the one at the forward end of the rod acting as an abutment for the forward end of a coiled spring 256 surrounding said rod, and the collar at the rear end of the rod acting as an engaging stop for the sliding collar 248. A forward movement of either of the pusher slides 237 and 238 is transmitted by means of the spring 256 to the finger 251, the first movement of which is an inward oscillation upon its pivot, throwing the point of the finger into engagement with the heddles in the channel 198. As soon as the finger reaches its inner limiting pin 254 a further movement of the pusher slide pushes said finger forwardly, thereby compacting a number of the heddles against the bracket 220. To retain the slide 252 at the rear end of its guide 253 until the inward oscillatory movement of the finger 251 is completed, I provide a flat spring 257 adapted to engage the outer face of said slide. The frictional engagement of the spring with the slide tends to delay the movement of the slide until the finger has been swung into the row of heddles. A guide 258 (Figs. 27 and 30) extends forwardly from the arm 205 of each of the boxes 195 and 196. The distance between the bracket 220 and the adjacent end of the guide 258 is just sufficient to admit a single heddle.

The mechanism is started and stopped by an ordinary belt-shifter 259 (Fig. 1) operated by a hand lever 260. This hand lever has a stud 260$^a$ (Figs. 38 and 39) projecting from its lower side, said stud being adapted to lie in either of two notches 261 and 262 formed in one edge of a slidably supported bar 263. The notches 261 and 262 are of such form that the stud 260$^a$ may pass from one to the other in manually starting and stopping the machine. The bar 263 yields laterally to permit the stud 260$^a$ to pass from one notch to the other. A spring 264 tends to slide the bar 263 in the direction to operate the lever 260 to shift the belt to the loose pulley, namely, toward the left in Figs. 1, 38 and 39. The bar 263 is normally locked against movement by means of a detent 265 guided in the machine frame and extending within an opening 266 in said bar. The detent 265 is connected to a lever-arm 267 which is pivoted in the machine frame. A rod 269 connects the lever-arm 267 with a crank arm 270 fixed on one end of an oscillatory shaft 271, which shaft carries at its opposite end a trigger-lever 272 extending upward into an undercut groove 97$^a$ (Fig. 11) of the thread guide 97. The groove 97$^a$ extends beneath the guide edges $x$ and $t$ (see Fig. 7). When the selector takes a thread from the warp and pushes the thread against the oblique portion $x$, the selector is deflected to the left (Fig. 7) and is thus prevented from entering the groove 97$^a$. In case the selector fails to take a thread, the selector passes into the groove 97$^a$ and strikes the trigger lever 272. The crank arm 270 is provided with an anti-friction roller 273 (Fig. 40) against which bears the end of a bent finger 274 fixed to one end of an arm 275 pivoted on the standard 1$^c$. A coiled spring 276 secured to the opposite end of the arm 275 presses the finger 274 against the roller 273.

268 is a dash-pot which is rigid with the lever arm 267. This dash-pot comprises a plunger 277 (Fig. 42) sliding in an oil cylinder and sustained therein by a coiled spring 279. The lower end of the cylinder connects with a reservoir 280 at the upper end of the dash-pot through a small duct 281. When the selector fails to grasp a thread, the forward end of said selector strikes against the trigger-lever 272, moving said trigger-lever, turning the shaft 271 upon which it is fixed, and raising the friction roller onto the inclined surface of the bent finger 274. The pressure of said finger instantly raises the arm 270 and through the connecting rod 269 moves the lever arm 267, withdrawing the detent 265 from the opening 266 in the sliding bar 263, and moving the trigger lever 272 out of the path of the selector, as shown in dotted lines in Fig. 40. The spring 264 thereupon draws the bar endwise and moves the shifter-lever 260, throwing the belt from the tight to the loose pulley. The movement of the lever arm 267 also throws the plunger 277 in to the path of one of the teeth upon the periphery of the disk 70, thus positively stopping the machine.

The automatic stop for the heddle-selectors is attached to the stop mechanism just described. Said heddle-selector stop is arranged as follows: An upwardly extending lever 282 (Fig. 6) is rigidly mounted upon a shaft 283 supported at the rear side of the post 1ᵇ. At its upper end said lever carries a roller 284 that lies against the periphery of the cam 69. To the other end of the shaft 283 is fixed a lever 285 (Figs. 18 and 19) on which a lever 286 is pivotally mounted. One end of the lever 286 underlies the end of the arm 267 of that part of the automatic stop mechanism hereinbefore described and overlies a bracket 294 which is fixed to the standard 1ᶜ. The parts 267 and 294 normally constitute a fulcrum or pivot for the lever 286. The cam 69 normally swings the lever 286 upwardly and a spring 293 normally swings said lever downwardly. Upon the other end of the lever 286 a rock arm 287 is pivotally mounted, the opposite ends of which rock arm pivotally support two stop rods 288. These rods extend upwardly beside the post 1ᵇ, their upper ends lying in openings 289 in the facing plates 232. Two levers 290 (Fig. 5) each pivotally mounted upon the upper side of one of said facing plates are adapted to swing over said rod openings 289, in which position said levers are normally held by means of springs 291. Keeper brackets 292 prevent upward displacement of the levers 290 by the stop rods 288. The forward ends of the levers 290 lie over the openings 234 in the facing plates 232 and directly in the path of the selected heddles, and when a heddle is taken by the selector mechanism the adjacent lever 290 is deflected, uncovering the opening 289. Both of the stop rods 288 receive an upward movement through the action of the cam 69 at each movement of the selector mechanism, and if no heddle is selected both of said rods are stopped against the under side of the levers 290. The upward movement of the rear end of the lever 286 thus being arrested, the opposite end of said lever is raised in the continuing movement of the cam 69, thereby lifting the lever 267 and causing it to raise the detent 265, operate the belt-shifter, and throw the dash-pot plunger 277 into the path of one of the stop shoulders upon the stop disk 70. In the normal operation of the machine, the rods 288 are stopped alternately by the levers 290. Upon the downward movement of the levers 285 and 286, the rock arm 287 is turned to bring the upper ends of the rods 288 into approximately the same horizontal plane through contact of said rock arm with one or the other of two stop pins 295 (Fig. 18) set in the post 1ᵇ (Fig. 19).

In the operation of the machine hereinbefore described, warp threads from a beam are secured in the clamps 22 and 25 of the warp carriage, are put under tension by oscillating the shaft 26 and thus moving the clamp 25 away from the clamp 22, and between their ends said threads are deflected slightly to one side by a longitudinal movement of the ribbon 43. A reed is placed upon the grooved bar 7, its end lying with the guide 9. Two harnesses, properly spaced by the spacer bars 14, are hung upon the hooks 12 of the slides 10, and said harnesses are moved so that their foremost heddles are in contact with the brackets 220. Motion is communicated to the mechanism to rotate the main shaft 57. The cam 67 gives the selector 89 an inward and outward movement across the forward edge of the warp in the carriage 16. The reed feed advances the reed and spreads the splits thereof, the heddle-selector slides 218 push one of the bunched heddles (first from one harness and then from the other) into the facers 207, said facers oscillate to face the heddles, the needle 158 reciprocates outwardly and inwardly between the separated splits of the reed and through the eye of the faced heddle, the cutting disk 111 severs the warp thread taken by the selector. During the inward movement of the selector the stripper 101 is given a forward (sidewise) movement by reason of its connection through the rod 105 with a portion of the supporting post 1ᵃ, and moves inwardly to withdraw the thread from the selector. When the rod 74 on which the selector and the stripper are mounted is slid away from the warp, the thread is drawn by the stripper under the needle 158, which by this time has moved outwardly to the forward extremity of its movement, the thread being brought into contact with the under side of the needle slightly inwardly of its hooked eye 159 (Fig. 9). At about this time the needle begins its return movement, during which the thread is drawn into its hooked eye 159 and pulled inwardly through the eye of the heddle and between the splits of the reed. At the rear of the reed the end of the thread is caught by the air current in the air-tube 174 and is drawn into said tube, where it is held until by the advance movement of the reed the thread is withdrawn from the tube. At each reciprocation of the needle the harness feed slide 184 is vertically reciprocated, and when the foremost heddle of either harness is rearward of the normal position of such heddle the hook 193 of the sensitive feeler 190 for said harness is held by gravity from engagement with the pin 194 extending from the harness feed pawl 181. As hereinbefore explained, the pawls 181 of the harness feed operate to advance the harnesses when they are not held from engagement with the ratchet teeth of the feed slides 10. Thus when the sensitive feed arms 190 are permitted to swing rearwardly a sufficient distance to free their hooks 193 from the pins 194 upon the reciprocation of said arms, the harnesses are moved forward through the distance of one tooth, or until the foremost heddles of the harnesses are advanced sufficiently to move the feelers 190 into a position where their hooks 193 engage said pins 194. The heddles are successively moved to one side from behind the feelers 190 by the selector slides and the facers. When the thread selector fails to catch a thread or the heddle-selectors to push a heddle into one of the facers, the automatic stop mechanism operates as hereinbefore described to shift the driving belt and bring the entire mechanism to an immediate stop.

In the following claims, I have, for the sake of brevity, used the term "heddle" to indicate a heddle, a drop-wire or other similar thread-engaging loom-element, and the term "harness" to denote a bank or series of such elements. While only two harnesses are shown, it will be understood that the invention may be embodied in machines for operating upon a larger number of harnesses.

I claim as my invention:

1. In a textile machine in which threads are to be selected singly and successively from a series of threads, means for supporting the threads in substantial parallelism, and means for bowing the entire series of threads laterally to place them under tension.

2. In combination, a heddle facer having a narrow space to receive a sheet metal heddle, and means for pushing a heddle out of said space.

3. In combination, a heddle facer having a narrow space to receive a sheet metal heddle, means for placing a heddle in said space, means for turning the facer to face the heddle, means for threading the heddle, and means for pushing the threaded heddle out of said space.

4. A machine for operating upon warps having, in combination, means for holding distended in parallel sequence a series of warp threads, the threads being held in the form of a sheet, a selector reciprocable transversely of the sheet to select threads singly and successively from the sheet, means for causing a relative feed movement between the selector and said thread-holding means, a drive for the selector, and drive controlling means actuated when the selector fails to select a thread.

5. In a warp-drawing machine, in combination, an oscillatory heddle facer comprising two arms rigidly connected together and having between them a narrow space for the reception of a heddle; means for moving a heddle into said space; means to turn the heddle facer in one direction after the heddle has been inserted in said space; means for inserting a warp thread into the faced heddle; means for removing the heddle from said facer, and means for thereafter turning the heddle facer in the opposite direction into position to receive another heddle.

6. In a warp-drawing machine, in combination, a heddle facer; a slide for moving a heddle into said facer; means for moving a heddle into position to be taken by said slide; and means for inserting a warp thread into the faced heddle.

7. In a warp-drawing machine, in combination, an oscillatory heddle facer comprising two arms having between them a narrow space for the reception of a heddle; a slide for moving a heddle into said space; means for moving a heddle into position to be taken by said slide; and means for inserting a warp thread into the faced heddle.

8. In combination, a movable heddle support; means for moving said support; and means operated by the heddles for controlling said moving means.

9. The combination of heddle-moving means, and means for moving a row of heddles for controlling said moving means.

10. In a feeding means, in combination, a toothed bar; a vibratory pawl adapted to engage said bar; and a pivoted longitudinally reciprocatory member adapted to be pivotally moved by the substance being operated on, and when so moved to disengage said pawl from said toothed bar.

11. In a feeding means, in combination, a toothed bar; a vibratory pawl adapted to engage said bar; a pin fixed to said pawl; and a pivoted longitudinally reciprocatory member having a hook thereon and adapted to be pivotally moved by the substance being operated on to bring said hook into engagement with said pawl.

12. In a harness feeding means, in combination, a movably-supported toothed bar; means attached to said bar for supporting a harness; and a vibratory pawl for moving said bar.

13. In a warp-drawing machine, in combination, a movably-supported toothed bar; means attached to said bar for supporting a harness; a vibratory pawl for moving said bar; a drawing-in mechanism; and means for withdrawing said pawl from said bar, which means is arranged to be actuated by a heddle at the drawing-in mechanism.

14. In a harness feeding means, in combination, a toothed bar; a vibratory pawl adapted to engage said bar; and a longitudinally reciprocatory member adapted to lie in contact with and be moved by a heddle, said member being adapted to engage said pawl to disengage it from said toothed bar.

15. In combination, means for moving a row of heddles, a feeler arranged to touch a heddle and control the moving means, and means to move the heddle past the feeler.

16. In a textile machine in which threads are to be selected singly and successively from a series of threads, means for supporting the threads in substantial parallelism, and means engaging the entire series of threads for releasably holding the series bowed to place them under tension, whereby when the threads are released they spring away from the bowed series.

17. In a warp-drawing machine, warp drawing means, a carriage for supporting in substantial parallelism a series of threads, said carriage being movable in a direction at right angles to the line of drawing-in action, and means for releasably bowing the entire series of threads in the general plane of the movement of the carriage and away from the place of drawing-in action, to place the threads under tension, whereby the threads tend to spring toward the place of drawing-in action.

18. In a heddle-facing device, in combination, a facer comprising two arms having between them a narrow space for the reception of a heddle, one of which arms is provided with a lip for guiding the heddle into said space; and means for oscillating said facer.

19. In combination, a support for a row of sheet metal heddles, and means for alternately compacting a plurality of the heddles and releasing them from the compacting pressure.

20. In combination, a support for heddles; a relatively stationary part; means for compacting a plurality of the heddles against said part; and a slide arranged to engage the edge of the heddle which is in contact with said part and move said heddle aside.

21. In a buncher mechanism for loom harnesses, in combination, a reciprocatory slide; a finger pivotally mounted on said slide for engaging the heddles of the harness, which finger is provided with a bell-crank; and means connected with said bell-crank for reciprocating said slide.

22. In a buncher mechanism for loom harnesses, in combination, a pivotally mounted finger adapted to swing into position to push heddles and means yieldingly connected with said finger for pivotally and bodily moving it.

23. In a buncher mechanism for loom harnesses, in combination, a slide; a finger pivotally mounted on said slide and provided with a bell-crank; and means yieldingly connected with said bell-crank for moving said slide.

24. In combination, a heddle support, a structure providing a channel through which relative movement between the heddles and said structure may occur, a part extending into said channel, means to compact heddles against one side of said part, a selector slide adjacent to said side of said part and reciprocable transversely of the channel, a heddle facer adapted to receive a selected heddle, and swing with said heddle to the other side of said part, and means for pushing the faced heddle out of the facer.

25. A warp-drawing machine having, in combination, a heddle facer, mechanism to stop the machine, a member located near the facer and arranged to control said mechanism, and means for moving a heddle into the facer, said member lying in the path of such movement of the heddle.

26. In combination, means for suspending a series of heddles; a heddle selector arranged to swing a heddle transversely of the series, and stop mechanism controlled by contact with a heddle when so swung.

27. In a warp-drawing machine, in combination, a drawing mechanism; a drive for the mechanism; means for disconnecting the drive from the mechanism; means constantly tending to actuate said disconnecting means; and locking means for said actuating means, said locking means being adapted to be operated upon the absence of a heddle.

28. In a warp-drawing machine, in combination, an oscillatory heddle facer; means for placing a heddle in position to be operated upon by said facer; means for disconnecting the driving power from the machine, adapted to be rendered inoperative by a heddle at the facer; and means for inserting a warp thread into the faced heddle.

29. In a warp-drawing machine, in combination, a heddle facer; means for moving a heddle into said facer; means for disconnecting the driving power from the machine, adapted to be rendered inoperative by a heddle at the facer; and means for inserting a warp thread into the faced heddle.

30. In combination, a reed-feeding element; a reed-spreading element, and means to actuate said elements alternately, the feeding element being arranged to engage the reed before the spreading element is disengaged from the reed.

31. In a reed-feed and spreader, in combination, a pivotally supported feed dog; a pivotally supported spreader dog; means for synchronously reciprocating said dogs in contrary directions; and means for restoring said dogs.

32. In a reed-feed and spreader, in combination, a pivotally supported feed dog; a pivotally supported spreader dog; means for synchronously reciprocating said dogs in contrary directions; and means for restoring said dogs, the forward end of said feed-dog being offset with relation to the forward end of the spreader dog.

33. In a reed feed, in combination, two slides; means for synchronously reciprocating said slides in contrary directions; a feeding dog pivotally supported upon one of said slides; and a spreader dog pivotally mounted upon the other slide.

34. In a warp-drawing machine, in combination, a drawing-in mechanism comprising a needle for drawing in the thread; and an exhaust air tube in position to take the drawn-in thread from said needle.

35. In combination, means for holding a warp; means for deflecting the warp threads at a point between their held ends; a thread-taking member adapted to have a yielding movement away from the warp, for taking single threads successively from said warp; and means for actuating said thread-taking member.

36. In combination, means for holding a warp; means for deflecting the warp threads at a point between their held ends; a pivotally mounted thread-taking member; means for moving said thread-taking member across the plane of said warp; and a spring for pivotally moving said thread-taking member toward said warp.

37. A selector provided with a series of thread-catches of differing sizes.

38. A selector provided with a series of thread-catches in hook form, said thread-catches being of differing sizes and being located between the ends of said selector.

39. A selector provided with a series of thread-catches of increasing size.

40. A textile machine having a reciprocatory thread-engaging member which is arranged to yield under the tension of the thread engaged.

41. A laterally yielding selector provided with a series of thread-catches, in combination with a warp frame to hold the warp threads under lateral tension; and means for moving the selector toward the thread to be engaged, whereby that thread will be freed from its lateral tension and will move the selector away from the next succeeding thread in the warp frame.

42. A laterally yielding selector provided with a series of thread-catches, in combination with a holder for the warp threads; an oblique thread guide; and means for moving the selector against a thread and carrying that thread into engagement with the oblique guide, whereby the selector is moved away from the next succeeding thread of a series of threads.

43. In combination, means for holding distended in parallel sequence a series of warp threads, a selector having a plurality of spaced thread-engaging devices, means for moving the selector across one edge of the series to permit one of said thread-engaging devices to take a thread, and means for preventing another of said thread-engaging devices from taking a thread.

44. In combination, means for supporting a warp, a reciprocatory selector having a plurality of thread-engaging devices located at intervals along the selector, means for reciprocating the selector across one edge of the warp to permit one of said thread-engaging devices to take a thread, and means for deflecting the selector to prevent another of said thread-engaging devices from taking a thread.

45. In combination, means for supporting a warp, a reciprocatory selector having a plurality of thread-engaging means located at intervals along the selector, means for reciprocating the selector across one edge of the warp to permit one of said thread-engaging means to engage a thread, and a part extending at an angle with the line of movement of the selector, against which part the engaged thread is carried by the selector whereby the latter is deflected from its course.

46. In combination, means for holding distended in parallel sequence a series of warp threads, a pivotally mounted selector having a plurality of thread-engaging means located at intervals along the selector, means for reciprocating the selector across one edge of the series to permit one of said thread-engaging means to engage a thread, and a part extending at an angle with the line of movement of the selector, against which part the engaged thread is carried by the selector whereby the latter is pivotally moved.

47. The combination of a laterally-yieldable selector with a thread-guide having an oblique portion and an undercut groove which the selector may enter upon the failure of said selector to engage a warp thread.

48. The combination of a selector with a spring-actuated finger for holding back adjacent warp threads, said finger lying in the path of a selected thread.

49. In combination, means for holding a series of warp threads, means for imparting sidewise deflection to the series, means for releasing the foremost thread from the deflecting means, and means for detaining a thread which may adhere to the released thread.

50. In combination, means for holding a series of warp threads, means for imparting sidewise deflection to the series, means for releasing the foremost thread from the deflecting means, means for detaining a thread which may adhere to the released thread, and means to limit the lateral movement of such detained thread due to its tension.

51. In combination, means for holding a series of warp threads, means for imparting lateral deflection to the series, a selector having a plurality of spaced thread-engaging devices, means for moving the selector across one edge of the series to permit one of said thread-engaging devices to release the foremost thread from the said deflecting means, means for detaining a thread which may adhere to the released thread, means for deflecting the selector to prevent another of said thread-engaging devices from taking a thread, and means to prevent such detained thread from moving laterally into position to be taken by one of the thread-engaging devices on the deflected selector.

52. In combination, two clamps for holding a warp, means for deflecting the warp between the clamps; means arranged to engage the threads adjacent to the deflecting means for releasing the threads from the deflecting means; and means operating adjacent to the deflecting means for detaining a thread which may adhere to a released thread.

53. In combination, a laterally yielding selector; a yoke for pivotally supporting said selector; a stem for said yoke; an arm on said stem; and means for moving said arm to adjust the position of the selector.

54. In combination, a laterally yielding selector; a yoke for pivotally supporting said selector; a stem for said yoke; an arm on said stem; and an eccentric for moving said arm to adjust the position of the selector.

55. In combination, two clamps for tightly clamping a warp; means for selecting single threads from the warp at a point between said clamps; and means to sever the selected threads.

56. In a warp-drawing machine, in combination, means for supporting a warp; means for supporting a loom harness and a loom reed; means for selecting threads from the warp; means for severing the selected threads; and means for putting the severed end of a selected thread through a harness eye and through a space in the reed.

57. In combination, means for supporting a warp; means for severing threads; a device for selecting threads from the warp and moving them into position to be cut by said severing means; and means for preventing the severed ends of the selected threads from jumping.

58. A warp-drawing machine comprising a warp-supporting means in which the warp is tightly clamped; a drawing-in mechanism comprising a thread-severing device; and means for causing relative traversing movement between the warp-supporting means and the drawing-in mechanism, the severing device severing successive threads of the warp to provide loose ends for drawing-in.

59. In combination, a warp-carriage; an operating mechanism, said operating mechanism comprising a thread-selecting device and a device for severing selected threads; and means for moving said warp-carriage to bring the threads contained therein into operative relation with the thread-selecting device, said thread-selecting device being arranged to move the threads into engagement with the severing device.

60. In combination, means for tightly clamping a warp; means for severing a thread; and means for selecting threads from the warp, said selecting means being arranged to move the threads into contact with the severing means.

61. In a warp-drawing machine, in combination, means for supporting a warp; means for supporting a loom element through which warp threads are to be drawn; means for selecting threads from the warp; means for severing the selected threads; and means for putting the severed ends of the selected threads through said element.

62. In combination, means for supporting a warp; means for severing threads; a thread-holder; and means for selecting threads from the warp and moving them first into the thread-holder and then into position to be cut by said severing means.

63. In combination, means for supporting a warp; a knife; and a device for selecting a thread from the warp and moving said thread against the knife.

64. In combination, means for supporting a warp; a thread-selecting device; means for severing selected threads; and a thread-holder located between the selecting device and the severing means in position to receive a selected thread before said thread is severed.

65. In combination, means for holding a warp; a reciprocatory selector arranged to move across one edge of the warp to take a thread therefrom; a stripper arranged to take such thread from the selector; and a needle arranged to take the thread from the stripper.

66. In a warp-drawing machine, means for tightly clamping a warp, means for selecting a thread from the warp, means for severing the selected thread, means for holding the severed end of the thread, a drawing needle, and a member arranged to engage the thread between the clamping means and the holding means and move the thread into the path of the needle.

67. In combination, means for holding distended in parallel sequence a series of warp threads, a reciprocatory selector having a plurality of thread-engaging devices located at intervals along the selector, means for reciprocating the selector across one edge of the series to permit one of said thread-engaging devices to take a thread, and a member arranged to strip the thread from any of said thread-engaging devices.

68. In a warp-drawing machine, means for holding a warp, a selector for taking a thread from the warp, a stripper for taking the thread from the selector, and a drawing needle adapted to engage the thread after it has been taken by the stripper.

69. In combination, means for holding a warp, a thread-holder, means for taking a thread from the warp and moving it into the holder, means for engaging a portion of the thread extending from the holder, and a drawing needle adapted to engage the portion of the thread extending between the holder and the thread-engaging means.

70. In combination, means for holding a warp; a thread holder; means for taking a thread from the warp and moving it into the holder; a notched member located between the thread-taking means and the thread holder; a hook for engaging the thread, removing it from the thread-engaging means, and drawing it into said notched member; and a needle adapted to engage a portion of the thread extending between the notched member and the hook.

71. In a warp clamping means, a relatively stationary jaw; a jaw movable toward and away from the other jaw; a lining of yieldable material for one of said jaws; an insertion bar having means to indent said lining; and means to move the second jaw toward the first jaw to clamp said bar.

72. In a thread clamp, in combination, a fixed member; a movable member having inclined teeth thereon; and means for moving the movable member toward the fixed member comprising a member having inclined teeth adapted to engage the teeth upon the movable member.

73. A frame for holding warp threads, provided with clamps for clamping said threads, in combination with a longitudinally-movable member between the clamps, across which member the threads extend and whereby the threads are given an oblique direction from the member to the clamps.

74. In combination, means for supporting a warp, a member having a roughened edge over which the warp extends; and means to move the member longitudinally to deflect the warp.

75. In combination, two clamps for tightly clamping a warp to prevent slippage of the threads in the clamps, means for causing relative separating movement of the clamps to stretch the threads, and means operable after the threads are clamped and stretched for laterally deflecting all of the threads at a point between their held ends.

76. In combination, two clamps for tightly clamping a warp to prevent slippage of the threads in the clamps, means for causing relative separating movement of the clamps to stretch the threads, a member extending transversely of the threads and between the clamps, and bearing against the entire series of threads, and means for longitudinally moving said member to deflect the threads.

77. In combination, two substantially parallel clamps for tightly clamping a warp to prevent slippage of the threads in the clamps, means for causing relative separating movement of the clamps to stretch the threads, a support extending substantially parallel with the clamps and between the latter, said support projecting at one side of a plane passing through the clamps so that the threads are bowed over said support, a member having a roughened edge and mounted for movement longitudinally of the support, the threads bearing against the roughened edge of said member, and means for longitudinally moving said member to deflect the threads laterally.

78. A warp-support, comprising a frame, a warp clamp attached to the frame; a warp clamp attached to the frame for movement relatively to the other clamp to stretch the warp; a member across which the stretched threads extend; and means for supporting said member at one side of the plane of said clamps, said member being longitudinally movable to deflect the threads.

79. A frame for holding warp threads, provided with clamps for clamping said threads, in combination with a longitudinally-movable member, which member has a roughened edge and is located between said clamps; and means for moving the member.

80. A frame for holding warp threads, provided with clamps for holding the threads; toggle levers for moving one of said clamps to stretch said threads; a bar between said clamps, a roughened thread-engaging member slidably supported by said bar; and means for moving said member longitudinally.

81. A frame for holding warp threads, provided with clamps at its opposite sides, one of said clamps having a pivotal connection with the remainder of said frame; toggle levers for moving said pivoted clamp; a bar between the clamps over which the warp threads are intended to be stretched, said bar having a sliding piece roughened upon its edge; a lever for moving said sliding piece longitudinally of said bar; and means for operating said clamps.

82. In a means for supporting and stretching warp threads, in combination, a frame; a clamp fixed with relation to said frame; a second clamp pivotally mounted on said frame; an arm fixed with relation to said pivoted clamp; an oscillatory shaft supported in said frame; and connections between said shaft and said arm whereby said clamp is moved upon the oscillation of said shaft.

83. In combination, means for supporting a warp, a selector for taking threads from the warp, stop mechanism including a part arranged to be engaged by the selector, and means for deflecting the selector when it has taken a thread, whereby the selector is prevented from engaging said part.

84. In combination, means for supporting a warp, a selector for taking threads from the warp, stop mechanism including a part arranged to be engaged by the selector, and selector-deflecting means against which the taken thread is carried by the selector, whereby the selector is prevented from engaging said part.

85. In a warp-drawing machine, means for holding a warp, a selector for taking a thread from the warp, a stripper for taking the thread from the selector, a drawing needle arranged to engage the thread after it has been taken by the stripper, stop mechanism including a part arranged to be engaged by the selector, and means for deflecting the selector when it has taken a thread, whereby the selector is prevented from engaging said part.

86. In an automatic stop for a machine, in combination, a selector; a thread-guide; a trigger lever in said thread-guide adapted to be engaged by the selector; and means actuated by said trigger lever for disconnecting the driving power from the machine.

87. In a textile machine, in combination, means for taking a thread; and means for supporting a warp, said warp-supporting means being adapted to hold said warp threads bowed away from the thread-taking means.

88. In a machine in which threads are to be selected singly and successively from a series of threads, means for supporting the threads in substantial parallelism, means for bowing the entire series of threads to place them under tension, and means to release the threads singly from said bowing means.

89. In a machine in which threads are to be selected singly and successively from a series of threads, two clamps for supporting the threads in substantial parallelism and under tension, the threads being held against slippage in said clamps, means engaging the entire series of threads for releasably holding the series bowed, and means to release the threads singly from the bowing means.

90. The combination of two clamps for tightly clamping a warp, a thread-deflecting member extending transversely of the warp and engaging that portion of the warp which extends between the clamps, and a thread selector arranged to engage the threads at a point adjacent to the deflecting member and release the threads from said member.

91. A warp-drawing machine having, in combination, a frame, a plurality of horizontal track bars rigidly secured to said frame, and a harness carrier movably mounted on each of said track bars.

92. A thread-selector consisting of a member having a plurality of thread-catches located at intervals along its length.

HOWARD D. COLMAN.

Witnesses:
EARLE D. PARKER,
LOUISE A. CULVER.

It is hereby certified that the name of the third-mentioned assignee in Letters Patent No. 1,211,677, granted January 9, 1917, upon the application of Howard D. Colman, of Rockford, Illinois, for an improvement in "Machines for Preparing Warps for Weaving," was erroneously written and printed as "Henry A. Severson," whereas said name should have been written and printed as *Harry A. Severson;* page 10, printed specification, lines 104–106, claim 9, strike out the words "heddle-moving means, and"; same page and claim, line 106, before the word "for" insert the words *and heddle-operated means;* and that the said Letters Patent should be read with these corrections therein that the same may conform to the record of the case in the Patent Office.

Signed and sealed this 20th day of February, A. D., 1917.

[SEAL.]

Cl. 139—94.

F. W. H. CLAY,
*Acting Commissioner of Patents.*